United States Patent
Yoshioka

(10) Patent No.: US 6,571,267 B1
(45) Date of Patent: May 27, 2003

(54) FLOATING POINT ADDITION/ SUBTRACTION EXECUTION UNIT

(75) Inventor: Shinichi Yoshioka, Tokyo (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/521,891

(22) Filed: Mar. 9, 2000

(30) Foreign Application Priority Data

Mar. 10, 1999 (JP) .......................................... 11-064059

(51) Int. Cl.[7] .................................................. G06F 7/42

(52) U.S. Cl. ..................................................... 708/505

(58) Field of Search ................................ 708/205, 497, 708/209, 670, 495, 552, 505, 498

(56) References Cited

U.S. PATENT DOCUMENTS

| | | | | |
|---|---|---|---|---|
| 4,926,369 A | | 5/1990 | Hokenek et al. ............ | 708/211 |
| 4,999,803 A | * | 3/1991 | Turrini et al. ............... | 708/209 |
| 5,128,889 A | * | 7/1992 | Nakano ....................... | 708/205 |
| 5,146,419 A | * | 9/1992 | Miyoshi et al. ............. | 708/211 |
| 5,317,527 A | | 5/1994 | Britton et al. .............. | 708/205 |
| 5,343,413 A | | 8/1994 | Inoue ......................... | 708/497 |
| 5,369,607 A | * | 11/1994 | Okamoto .................... | 708/205 |
| 5,424,968 A | | 6/1995 | Okamoto .................... | 708/205 |
| 5,530,663 A | | 6/1996 | Garcia et al. ............... | 708/709 |
| 5,764,549 A | | 6/1998 | Bjorksten et al. .......... | 708/205 |
| 5,771,183 A | | 6/1998 | Makineni .................... | 708/205 |
| 5,798,952 A | | 8/1998 | Miller, Jr. et al. ......... | 708/211 |
| 5,831,884 A | | 11/1998 | Suzuki ........................ | 708/211 |
| 6,085,211 A | * | 7/2000 | Yoshioka .................... | 708/205 |
| 6,085,212 A | * | 7/2000 | Oberman .................... | 708/497 |

OTHER PUBLICATIONS

Hiroaki Suzuki et al., Leading–Zero Anticipatory Logic for High–Speed Floating Point Addition, Aug. 8, 1996, IEEE Journal of Solid State Circuits, vol. 31, p. 1157–1164.*

Kawaguchi et al., Floating point addition and subtraction arithmetic circuit peforming preprocessing of addition or subtraction operation rapidly, Jan. 29, 1997, European Patent Application.*

E. Hokenek et al., "Leading–zero anticipator (LZA) in the IBM RISC System/6000 floating point execution unit," IBM. J. Res. Develop., vol. 34, No. 1, Jan. 1990, pp. 71–77.

Hiroaki Suzuki et al., "Leading–zero Anticipatory Logic for High–speed Floating Point Addition," IEEE 1995 Custom Integrated Ciruits Conference, 1995, pp. 589–592.

* cited by examiner

Primary Examiner—Chuong Dinh Ngo
Assistant Examiner—Chat C Do
(74) Attorney, Agent, or Firm—Foley & Lardner

(57) ABSTRACT

In a floating point execution unit capable of executing arithmetic operation at high speed, a canceling prediction circuit (60) inputs directly operands before processing of selectors (2 and 3) and predicts a canceling generated in a subtraction result of the operands executed by a subtraction unit (5). The canceling prediction circuit (60) performs the canceling prediction without waiting the completion of carry adjustment of the operands executed by selecting and then executing the selectors (2 and 3). In addition, the prediction error detection circuit (100). Accordingly, when the subtraction result of the subtraction circuit (5) is output through a selector (12), or before the subtraction result is output, the canceling prediction can be executed. Thereby, the left shifter (8) can execute normalization operation for the subtraction result. without waiting, and the error compensation shifter (9) can also execute the compensation operation of the canceling prediction without waiting by using a compensation signal output from the prediction error detection circuit (100).

6 Claims, 14 Drawing Sheets

FLOATING POINT ADDITION/SUBTRACTION EXECUTION UNIT

BACKGROUND OF THE INVENTION

1. Field of the Invention

The present invention relates to a floating point execution unit having a canceling prediction circuit and a prediction error detection circuit for judging the necessary of the shifting for the compensation of one bit error, and more particularly, the invention relates to a method to perform the arithmetic operation at high speed.

2. Description of the Related Art

In order to true up or justify leftward the most significant bit of a mantissa part onto a particular position or digit, a normalization process is needed in a floating point execution unit after the calculation operation of addition and subtraction has been completed. This normalization process is such a process that the number of "0's" or "1's" which are aligned continuously from the most significant digits of the arithmetic result are counted and then the arithmetic result is shifted leftward by digits corresponding to the counted number of leading "0's" or "1's".

With the progress of the processor speed, such a method has been proposed that enables to predict the number of "0's" or "1's" which are aligned continuously from the most significant digits of the arithmetic result in parallel with the calculation process (LZA: Leading Zero Anticipation method, a canceling prediction method or a canceling prediction circuit). This canceling prediction method has been set forth in papers published by E. HOKENEK (IBM, J. RES. DEVELP. VOL.34, 1990, pp.71–77), H. SUZUKI et al.(CICC Cproc., 1995, pp.27.5.1–27.5.4), etc.

The basic conception of the canceling prediction method of E. HOKENEK briefly will be explained below.

First, corresponding bits in mantissa parts of two operands are compared. Second, three inputs G, Z, and P are defined based on the comparison result of each comparison operation. The G-inputs indicates that corresponding bits are both "1". The Z-inputs indicates that corresponding bits are both "0". The P-inputs indicates that corresponding bits are "1" and "0". Because each comparison result has one of the G-inputs, Z-inputs, and P-inputs, the canceling bit at which canceling occurs can be specified when the comparison results of the corresponding bits of the mantissa parts are detected from the most significant bit to the least significant bit according to the state transition diagram shown in FIG. 1.

For example, the following subtraction will be considered:

1.00010000000000010000000=$Fa\langle 23:0\rangle$−)
1.00001111000000000000000=$Fb\langle 23:0\rangle$ 0.00000001000000010000000

An actual operation for the above subtraction performs an addition between $Fa\langle 23:0\rangle$ and a complement on $Fb\langle 23:0\rangle$ are added. The complement on $Fb\langle 23:0\rangle$ is obtained by adding the least significant bit A1" to $Fbx\langle 23:0\rangle$ obtained by inverting $Fb\langle 23:0\rangle$.

That is to say, 1.00010000000000010000000=$Fa\langle 23:0\rangle$+)
0.11110000111111111111111=$Fbx\langle 23:0\rangle$ 0.00000001000000001111111

In addition, 0.00000001000000001111111+) 1

0.00000001000000010000000

The result of this arithmetic operation has the canceling of 8 bits. In general, the canceling prediction in order to predict the canceling is performed with subtraction operation in parallel.

Firstly, when each bit in the result of the arithmetic operation described above is defined with the three inputs, G (both "1"), Z (both "0"), and P ("1" and "0"), the following result is obtained.

1.00010000000000010000000=$Fa\langle 23:0\rangle$+)
0.11110000111111111111111=$Fbx\langle 23:0\rangle$

P.PPPGZZZZPPPPPPPGPPPPPPP 0.00000001000000010000000=$EE\langle 23:0\rangle$

When the above result (P.PPPGZZZZPPPPPPPGPPPPPPP) is checked from the most significant bit to the least significant bit based on the state transition diagram shown in FIG. 1, the P state is repeated in the pattern "P.PPP",the following inputs pattern "G" transits from the P state to the G state. Then, the Z state is repeated in the pattern "ZZZZ". The canceling is detected at the following P state.

In the paper of H. SUZUKI, only signals (canceling prediction bit signals) are extracted. These signals are so predicted that the: canceling from the Z state shown in FIG. 1 occurs. Then, a priority encoder detects the most significant bit in these signals.

This operation realizes the logic to generate the canceling prediction bit signal based on that the difference of mantissa parts in two operands have already been known. Because the two operands are switched in order to obtain the positive result of, subtraction when subtraction is performed, there is no transition to the G state.

That is, canceling occurs only when the symbol pattern in the alignment of the result changes from the Z-inputs to the P-inputs (Z→P) or the G-inputs (Z→G). This meaning is defined by using the following logic:

$EE\langle i\rangle = (Z\langle i\rangle$ and $G\langle i-1\rangle)$ or $(Z\langle i\rangle$ and $P\langle i-1\rangle)$.

Thus, the canceling bit prediction signal $EE\langle i\rangle$ can be generated by checking adjacent 2 bits in the result of the arithmetic operation. The above example of subtraction shows $EE\langle 15\rangle$="1" at which the canceling occurs. In order to convert the position of the canceling to a binary number, a priority encoder is used because the most significant bit of the value "1" in the $EE\langle i\rangle$ has a significant meaning. By passing the $EE\langle i\rangle$ through the priority encoder, the position at which the canceling occurs can be thereby represented by the binary number.

In these method described above, the canceling position is detected from the most significant bit of the result toward the least significant bit. However, the position of the canceling is changed by a carry signal propagated from a lower significant bit. In the above example, a carry signal is propagated from the bit number <7>. If the carry propagation does not occur, the position of the canceling is shifted rightward by one bit. That is, the canceling prediction by the above two methods includes one bit prediction error.

By the way, the normalization process performs a left shifting operation based on the result obtained by the canceling prediction circuit. However, because the result of the canceling prediction circuit includes an one bit prediction error, it must be necessary to perform the shift operation for the one bit error compensation immediately after the left shifting process for the normalization.

The one bit prediction error can be detected by checking the most significant bit in the arithmetic result that has been normalized. By using the detection result, it may be judged whether the compensation operation for one bit error is necessary or not.

The Japanese Laid open publication number JP-A-10/6026 proposed and disclosed a method to detect the one bit prediction error with the canceling prediction operation, simultaneously.

Next, a description will be given of the configuration of conventional floating point execution units.

FIG. 2 shows an example of a conventional typical floating point execution unit including a conventional canceling prediction circuit (a leading zero anticipator).

In the conventional floating point execution unit shown in FIG. 2, a comparison of exponent parts is executed before addition and subtraction, and then a mantissa part of the operand having the smaller exponent part based on the comparison result is shifted to the right direction (alignment). In addition to this operation, the normalization (left shifting) is performed after subtraction (or addition).

In the conventional floating point execution unit having the above configuration, the canceling prediction circuit performs the canceling prediction by using two operands after the alignment of the mantissa parts before addition and subtraction.

The comparison circuit 1 performs the comparison of the difference of exponent parts in the operands. The pair of selectors 2 and 3 inverts one of the mantissa parts Fa<23:0> and Fb<23:0> in the operands, or does not invert any one based on the difference of exponent. After this operation, the right shifter 4 performs the right shifting (alignment) for the mantissa part in the operand having the smaller exponent part is executed.

The addition and subtraction unit 16 performs an addition or a subtraction of the mantissa parts Fa<23:0> and Fb<23:0> in the operands that have been aligned, and outputs the result of the addition or the subtraction to the left shifter 8.

At the same time, the mantissa parts Fa<23:0> and Fb<23:0> after the alignment are transferred to the canceling prediction circuit 6 and size comparison circuit 7. Thus, the canceling prediction and the addition subtraction operation are executed in parallel.

The left shifter 8 performs the normalization by executing the left shifting to shift the arithmetic result of the addition subtraction unit 5 by using a shift amount control signal as the result of the canceling prediction by the canceling prediction circuit 6.

Because the shift amount control signal as the execution result of the canceling prediction circuit 6 includes one bit prediction error, the error compensation shifter 9 performs the one bit error compensation shifting (left shifting) based on the prediction error signal provided from the prediction error detection circuit 10 that has been obtained following the left shifting for the normalization.

The prediction error detection circuit 10 detects an one bit error based on the prediction information from the canceling prediction circuit 6 and the comparison information from the size comparison circuit 7.

FIG. 3 shows a configuration of a conventional floating point execution unit whose operation speed is higher than that of the conventional floating point execution unit shown in FIG. 2. As shown in FIG. 4, the conventional floating point execution unit shown in FIG. 3 switches operation paths based on whether or not the value of the difference of the exponent parts Expa and Expb in the operands is not less than 2.

In the subtraction when the difference of the exponent parts in the subtraction is not less than 2, or in the addition, the addition subtraction processing is executed through the following path: The right shifter 13; the selectors 14 and 15; and the addition subtraction unit 16. In this case, the alignment of the mantissa parts is executed before the operation of the addition subtraction unit 16. At this time, because at most one bit normalization processing is necessary for the mantissa parts, it is not necessary to incorporate any dedicated barrel shifter. As a result, it is possible to reduce the operation time for the normalization of the mantissa parts after the execution of the addition subtraction unit 16 (see FIGS. 4 and 5).

On the other hand, in the subtraction when the difference of the exponent parts is not more than 1, because the alignment of the mantissa parts before the subtraction executed by the subtraction unit 5 is within one bit, it is not necessary to use any dedicated barrel shifter. However, because it is necessary to execute the normalization for the maximum 24 bits in the normalization processing for the mantissa parts after the subtraction, the dedicated 24 bit barrel shifter (the left shifter 8 shown in FIG. 3) is required.

The subtraction is executed through the following path in the floating point execution unit: The selectors 2 and 3; the subtraction unit 5 inverter 11; selector 12; the left shifter 8; and the error compensation shifter 9.

As described above, by switching the paths by the selector 17, one of which is used based on the difference of the exponent parts, it is possible to reduce the operation time for the alignments before and after the arithmetic operation and the operation time for, the normalization as shown in FIG. 5. This causes to increase the operation speed of the conventional floating point execution unit.

By the way, in the conventional floating point execution unit shown in FIG. 3, the canceling prediction is executed by supplying the two operands, which have been selected and inverted by the pair of the selectors 2 and 3, to the canceling prediction circuit 6 based on the difference of the exponents parts of the two operands. Accordingly, the timing of the shift amount control signal by the canceling prediction circuit 6 must be delayed, because the operation of the selectors 2 and 3 is executed after operation of the comparison circuit 1 to output the difference of the exponent parts. This causes to increase the total operation time of the floating point execution unit.

SUMMARY OF THE INVENTION

Accordingly, an object of the present invention is, with due consideration to the drawbacks of the conventional floating point execution unit, capable of performing the canceling prediction operation without waiting the completion of the comparison of exponent parts in operands to be used for the alignment of the operands, and thereby capable of executing the arithmetic operation at high speed.

In accordance with one aspect of the present invention, a floating point execution unit in which a subtraction circuit executes a subtraction operation only when a difference of exponent parts in two operands as floating point numbers is 1, 0, and −1. This floating point execution unit comprises a first selection circuit, a subtraction circuit, a second selection circuit, a left shifter circuit, an error compensation circuit, a canceling prediction circuit, and a prediction error detection circuit.

The first selection circuit aligns a carry of said mantissa parts in said two operands by selecting one of cases where one of said mantissa parts in said two operands is shifted by one bit and no mantissa parts are shifted, by comparing exponent parts in said two operands. The subtraction circuit executes a subtraction of said mantissa parts in said two operands after said alignment. The second selection circuit selects one of said subtraction result and an inverted value that is obtained by inverting said subtraction result. The left shifter circuit executes normalization operation for said selected one output from said second selection circuit. The error compensation circuit compensates a canceling prediction error in said subtraction result after said normalization operation. The canceling prediction circuit generates a canceling bit prediction signal of said subtraction result based on said mantissa parts of said two operands before said alignment executed by said first selection circuit, and then determines a position of said, canceling bit. The prediction error detection circuit generates a compensation signal to compensate a prediction error indicated by said canceling bit prediction signal from said canceling prediction circuit. In the floating point execution unit of the present invention, said left shifter circuit executes said normalization operation for said subtraction result by shifting it leftward from said position of said canceling bit generated by said prediction error detection circuit, and said error compensation circuit compensates said canceling prediction error for said subtraction result that has been normalized based on said compensation signal output from said prediction error detection circuit.

Because the canceling prediction circuit directly inputs the two operands before the size comparison operation for the exponent parts in the two operands, namely, before alignment, and then performs the prediction to determine the position of the canceling bit and also to detect the canceling error, it is possible to determine the position of the canceling bit when or before the subtraction circuit outputs the subtraction result. Accordingly, by using the position of the canceling bit, the normalization operation can be executed immediately following the subtraction circuit outputs the subtraction result without any waiting and the following canceling error compensation operation can also be executed. Thereby, the floating point execution unit can perform at high speed.

In accordance with another aspect of the present invention, said canceling prediction circuit comprises:

a first canceling bit prediction signal generation circuit for generating said canceling bit prediction signal for said subtraction result when said difference of said exponent parts in said two operands is 1;

a second canceling bit prediction signal generation circuit for generating said canceling bit prediction signal for said subtraction result when said difference of said exponent parts in said two operands is −1;

a third canceling bit prediction signal generation circuit for generating said canceling bit prediction signal for said subtraction result when said difference of said exponent parts in said two operands is 0 and said difference of said mantissa parts in said two operands is positive;

a fourth canceling bit prediction signal generation circuit for generating said canceling bit prediction signal for said subtraction result when said difference of said exponent parts in said two operands is 0 and said difference of said mantissa parts in said two operands is negative;

a first selection circuit for selecting one of said canceling bit prediction signals generated by said first canceling bit prediction signal generation circuit and said third canceling bit prediction signal generation circuit when said difference of said exponent parts in said two operands is 1 or 0, a second selection circuit for selecting one of said canceling bit prediction signals generated by said second canceling bit prediction signal generation circuit and said fourth canceling bit prediction signal generation circuit when said difference of said exponent parts in said two operands is −1 or 0, a first canceling bit position determination circuit for determining a position of said canceling bit based on said canceling bit prediction signal selected by said first selection circuit;:

a second canceling bit position determination circuit for determining a position of said canceling bit based on said canceling bit prediction signal selected by said second selection circuit; and a third selection circuit for selecting one of said positions of said canceling bits determined by said first canceling bit position determination circuit and said second canceling bit position determination circuit based on a sign of said difference of said mantissa parts in said two operands.

In accordance with another aspect of the present invention, said canceling prediction circuit comprises:

a first canceling bit prediction signal generation circuit for generating said canceling bit prediction signal for said subtraction result when said difference of said exponent parts in said two operands is 1;

a second canceling bit prediction signal generation circuit for generating said canceling bit prediction signal for said subtraction result when said difference of said exponent parts in said two operands is −1;

a third canceling bit prediction signal generation circuit for generating said canceling bit prediction signal for said subtraction result when said difference of said exponent parts in said two operands is 0 without comparing said mantissa parts of said two operands;

a first selection circuit for selecting one of said canceling bit prediction signals generated by said first canceling bit prediction signal generation circuit, said second canceling bit prediction signal generation circuit, and said third canceling bit prediction signal generation circuit according to said values 1, −1, and 0 of said difference of said exponent parts in ;said two operands; and a canceling bit position determination circuit for determining a position of said canceling bit based on said canceling bit prediction signal selected by said first selection circuit.

In accordance with still another aspect of the present invention, a floating point execution unit for switching operation procedures according to absolute values (that are not less than 2 and less than 2) of a difference of exponent parts in two operands as floating point numbers.

This floating point execution unit comprises an addition subtraction unit, a subtraction unit, an exponent part comparison unit, a right shifter;

a size comparison unit, a canceling prediction circuit having a canceling bit prediction signal generation circuit and a canceling bit position determination circuit, a canceling error detection circuit, a left shifter; and an error compensation shifter.

The addition subtraction unit performs an addition and performs a subtraction when said absolute value of said difference of said exponent parts in said two operands is not less than 2. The subtraction unit performs only a subtraction when said absolute value of said difference of said exponent parts in said two operands is less than 2. The exponent part comparison unit calculates said difference of said exponent parts in said two operands. The right shifter performs an alignment of said mantissa parts in said two operands. The size comparison unit compares a size of said mantissa parts of said two operands. The canceling bit prediction signal generation circuit in the canceling prediction circuit predicts an amount of canceling occurred in a subtraction result of said subtraction unit within an error of one bit, and then generates a canceling bit prediction signal indicating a position of said canceling bit. Th e canceling bit position determination circuit in the canceling prediction circuit converts said canceling bit prediction signal to a binary number and outputs it as a canceling prediction signal. The canceling error detection circuit detects an error of said canceling prediction signal. The left shifter performs a normalization operation for said subtraction result from said subtraction unit by shifting said subtraction result leftward. The error compensation shifter compensates said error of said subtraction result based on said detection result detected by said prediction error detection circuit.

In said floating point execution unit of the present invention, said subtraction unit performs a subtraction operation between said mantissa parts of said two operands, or between one mantissa part and a shifted value obtained by shifting another mantissa part rightward in said two operands based on said difference of said exponent parts from said exponent comparison unit, and then outputs a subtraction result. Said canceling prediction circuit inputs directly said mantissa parts of said two operands and also inputs said difference of said exponent parts from said exponent comparison unit, and outputs said canceling prediction amount, caused by said subtraction operation by said subtraction unit, to said left shifter, Said prediction error detection circuit inputs directly said mantissa parts in said two operands, inputs said difference of said exponent parts from said exponent comparison unit, inputs said canceling prediction signal from said canceling prediction circuit, and inputs a comparison result of said mantissa parts output from said size comparison unit, and then outputs an error detection signal indicating a presence of said prediction error output from said canceling prediction circuit. Said left shifter performs said normalization operation by shifting leftward said subtraction result output from said subtraction unit based on a canceling prediction amount indicated by said canceling prediction signal output from said canceling prediction circuit. Said error compensation shifter compensates an error of said subtraction result normalized by said left shifter based on said error detection signal output from said prediction error detection circuit.

In the floating point execution unit in accordance with a further aspect of the present invention, said canceling prediction circuit predicts said canceling amount included in said subtraction result obtained by said subtraction unit within an error of; one bit. Said canceling bit prediction signal generation circuit generates said canceling bit prediction signal EE in the following cases (I), (IIa), (IIb), and (III) based on said difference of said exponent parts (Exa−Exb) in said two operands, where, said mantissa parts in said two operands "a" and "b" are Fa<n:0> and Fb<n:0>, each having "n+1" bit width, said exponent parts are Exa and Exb, a logical product is "and", a logical sum is "or", an exclusive logical sum is "xor", and a logical not is "not":

(I) when Exa−Exb=1, said canceling bit prediction signal EE to indicate said predicted position of said canceling bit caused in subtraction result between continuous two bits in said two operands is predicted by following logic:

$EE<i>=(\text{not }(P<i>))$ and $(\text{not }(Z<i-1>))$, wherein, when an integer i is i<n, $G<i>=(Fa<i>)$ and $(\text{not }(Fb<i+1>))$, $P<i>=(Fa<i>)$ xor $(\text{not }(Fb<i+1>))$, $Z<i>=(\text{not }(Fa<i>))$ and $(Fb<i+1>)$, and $G<n>=1$, $Z<n>=P<n>=0$, $Z<-1>=Fb<0>$, $G<-1>=0$, and $P<-1>=$ not $(Fb<0>)$;

(IIa) Under the assumption of Exa−Exb=0 and Fa−Fb>0, said canceling bit prediction signal EE to indicate said predicted position of said canceling bit caused in subtraction result between continuous two bits in said two operands is predicted by following logic:

$EE<i>=(\text{not }(P<i>))$ and $(\text{not }(Z<i-1>))$, wherein, when an integer i is i<n, $G<i>=(Fa<i>)$ and $(\text{not }(Fb<i>))$, $P<i>=(Fa<i>)$ xor $(\text{not }(Fb<i>))$, $Z<i>=(\text{not }(Fa<i>))$ and $(Fb<i>)$, and $P<n>=1$, $G<n>=Z<n>=0$, $Z<-1>=0$, $G<-1>=0$, and $P<-1>=1$;

(IIb) under assumption of Exa−Exb=0 and Fa−Fb<0, said canceling bit prediction signal EE to indicate said predicted position of said canceling bit caused in subtraction result between continuous two bits in said two operands is predicted by following logic:

$EE<i>=(\text{not }(P<i>))$ and $(\text{not }(G<i-1>))$, wherein, when an integer i is i<n, $G<i>=(Fa<i>)$ and $(\text{not }(Fb<i>))$, $P<i>=(Fa<i>)$ xor $(\text{not }(Fb<i>))$, $Z<i>=(\text{not }(Fa<i>))$ and $(Fb<i>)$, and $P<n>=1$, $G<n>=Z<n>=0$, $Z<-1>=0$, $G<-1>=0$, and $P<-1>=1$;

(III) when Exa−Exb=−1, said canceling bit prediction signal EE to indicate said predicted position of said canceling bit caused in subtraction result between continuous two bits in said two operands is predicted by following logic:

$EE<i>=(\text{not }(P<i>))$ and $(\text{not }(G<i-1>))$, wherein, when an integer i is i<n, $G<i>=(\text{not }Fb<i>)$ and $(Fa<i+1>))$, $P<i>=(\text{not }Fb<i>)$ xor $(Fa<i+1>))$, $Z<i>=Fb<i>$ and $(\text{not }(Fa<i+1>))$, and $Z<n>=1$, $G<n>=P<n>=0$, $G<-1>=Fa<0>$, $Z<-1>=0$, and $P<-1>=$ not$(Fa<0>)$.

In the floating point execution unit, said canceling bit position determination circuit is two for two cases in which said difference of said mantissa parts is positive or assumed as positive, and said difference of said mantissa parts is negative or assumed as negative, and said canceling bit position determination circuit outputs said canceling bit position in binary number expression which is a most significant bit "i" in said $EE<i>="1"$, and selects one of said canceling bit positions in said two cases based on said value (Fa−Fb) output from said size comparison circuit. With said canceling bit position determination circuit, said canceling prediction error detection circuit determines the values $G(-1)<k-1>$ and $Z(-1)<k-1>$, where, $P(k)<k>=P<k>$, $G(k)<k>=G<k>$, $Z(k)<k>=Z<k>$, $P(k)<k+1>=(P(k+1)<k+1>)$ and $(P(k)<k>)$, $G(k)<k+1>=(G(k+1)<k+1>)$ and $\{(P(k+1)<k+1>)$ and $(G(k)<k>)\}$, $Z(k)<k+1>=(Z(k+1)<k+1>)$ or $\{(P(k+1)<k+1>)$ and $(Z(k)<k>)\}$, and $P(m)<k>=(P(n)<k>)$ and $\{(P(m)<n-1>)$ $(m<n<k)$, $G(m)<k>=G(n)<k>$ or $\{(P(n)<k>)$ and $(G(m)<n-1>)\}(m<n<k)$, $Z(m)<k>=Z(n)<k>$ or $\{(P(n)<k>)$ and $(Z(m)<n-1>)\}(m<n<k)$, and said canceling prediction error detection circuit selects said $G(-1)<k-1>$ when (Fa−Fb)<0 that is output from said size comparison circuit, and said $Z(-1)<k-1>$ when (Fa−Fb)>0 that is output from said size comparison circuit.

In the floating point execution unit in accordance with another aspect of the present invention, said canceling prediction circuit predicts a canceling amount included in said subtraction result obtained by said subtraction unit within an error of one bit. Said canceling bit prediction signal generation circuit generates said canceling bit prediction signal EE in the following logic cases (I), (II), and (III) based on said difference: of said exponent parts (Exa−Exb) in said two operands, where, said mantissa parts in said two operands "a" and "b" are Fa<n:0> and Fb<n:0>, each having "n+1" bit width, said exponent parts are Exa and Exb, a logical product is "and" and a logical sum is "or", an exclusive logical sum is "xor", and a logical not "not":

(I) when Exa−Exb=1, said canceling bit prediction signal EE to indicate said predicted position of said canceling bit caused in subtraction result between continuous two bits in said two operands is predicted by following logic:

$EE<i>=($not $(P<i>))$ and $($not $(Z<i-1>))$, wherein, when an integer i is i<n, $G<i>=(Fa<i>)$ and $($not $(Fb<i+1>))$, $P<i>=(Fa<i>)$ xor $($not $(Fb<i+1>))$, $Z<i>=($not $(Fa<i>))$ and $(Fb<i+1>)$, and $G<n>=1, Z<n>=P<n>=0, Z<-1>=Fb<0>, G<-1>=0,$ and $P<-1>=$ not $(Fb<0>)$;

(II) when Exa−Exb=0, said canceling bit prediction signal EE to indicate said predicted position of said canceling bit caused in subtraction result between continuous three bits in said two operands is predicted by following logic:

$EE<i>=[P<i+1>$ and $\{(Z<i>$ and $($not $(G<i-1>)))$ or $(G<i>$ and $($not $(Z<i-1>)))\}]$ or $[$not $(P<i+1>)$ and $\{(Z<i>$ and $($not$(Z<i-1>)))$ or $(G<i>$ and $($not $(G<i-1>)))\}]$, wherein, when an integer i is i<n, $G<i>=(Fa<i>)$ and $($not $(Fb<i>))$, $P<i>=(Fa<i>)$ xor $($not $(Fb<i>))$, $Z<i>=($not $(Fa<i>))$ and $(Fb<i>)$, and $P<n>=1, G<n>=Z<n>=0, Z<-1>=0, G<-1>=0,$ and $P<-1>=1$; and (III) when Exa−Exb=−1, said canceling bit prediction signal EE to indicate said predicted position of said canceling bit caused in subtraction result between continuous two bits in said two operands is predicted by following logic:

$EE<i>=($not $(P<i>))$ and $($not $(G<i-1>))$, wherein, when an integer i is i<n, $G<i>=($not $Fb<i>)$ and $(Fa<i+1>)$, $P<i>=($not $Fb<i>)$ xor $(Fa<i+1>)$, $Z<i>=Fa<i>$ and $($not $(Fa<i+1>))$, and $Z<n>=1, G<n>=P<n>=0, G<-1>=Fa<0>, Z<-1>=0,$ and $P<-1>=$ not$(Fa<0>)$.

In the floating point execution unit, said canceling bit position determination circuit outputs said canceling bit position in binary number expression which is a most significant bit "i" in said $EE<i>="1"$.

with said canceling bit position determination circuit, said canceling prediction error detection circuit determines the values $G(-1)<k-1>$ and $Z(-1)<k-1>$, where, $P(k)<k>=P<k>, G(k)<k>=G<k>, Z(k)<k>=Z<k>$, $P(k)<k+1>=(P(k+1)<k+1>)$ and $(P(k)<k>)$, $G(k)<k+1>=(G(k+1)<k+1>)$ and $\{(P(k+1)<k>)$ and $(G(k)<k>)\}$, $Z(k)<k+1>=(Z(k+1)<k+1>)$ and $\{(P(k+1)<k>)$ and $(Z(k)<k>)\}$, and $P(m)<k>=(P(n)<k>)$ and $\{(P(m)<n-1>)(m<n<k)$, $G(m)<k>=G(n)<k>$ or $\{(P(n)<k>)$ and $(G(m)<n-1>)\}(m<n<k)$, $Z(m)<k>=Z(n)<k>$ or $\{(P(n)<k>)$ and $(Z(m)<n-1>)\}(m<n<k)$, and said canceling prediction error detection circuit selects said $G(-1)<k-1>$ when (Fa−Fb)<0 that is output from said size comparison circuit, and said $Z(-1)<k-1>$ when (Fa−Fb)>0 that is output from said size comparison circuit.

BRIEF DESCRIPTION OF THE DRAWINGS

These and other objects, features, aspects and advantages of the present invention will become more apparent from the following detailed description of the present invention when taken in conjunction with the accompanying drawings, in which.

DESCRIPTION OF THE PREFERRED EMBODIMENTS

Other features of this invention will become apparent through the following description of preferred embodiments which are given for illustration of the invention and are not intended to be limiting thereof.

First Embodiment

Hereinafter, we will explain the floating point execution unit as preferred ;embodiments according to the present invention in detail with reference to accompanying drawings.

Figure 1:
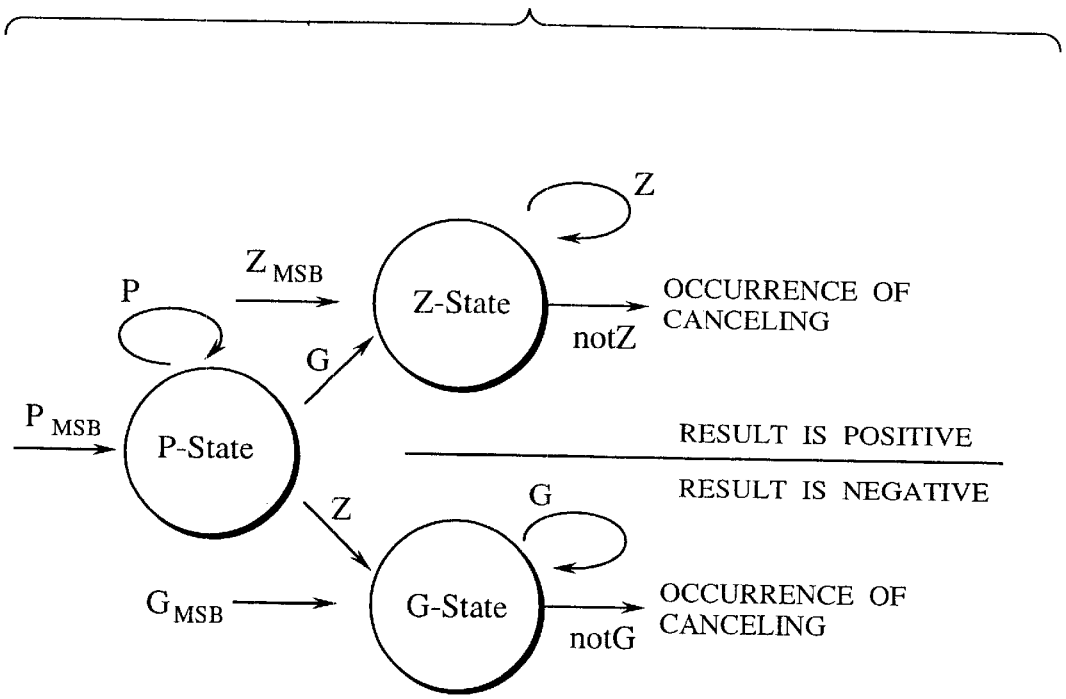
FIG. 1 is a diagram showing a state transition diagram of three states G, Z, and P explaining a basic principle of canceling prediction.
Figure 2:
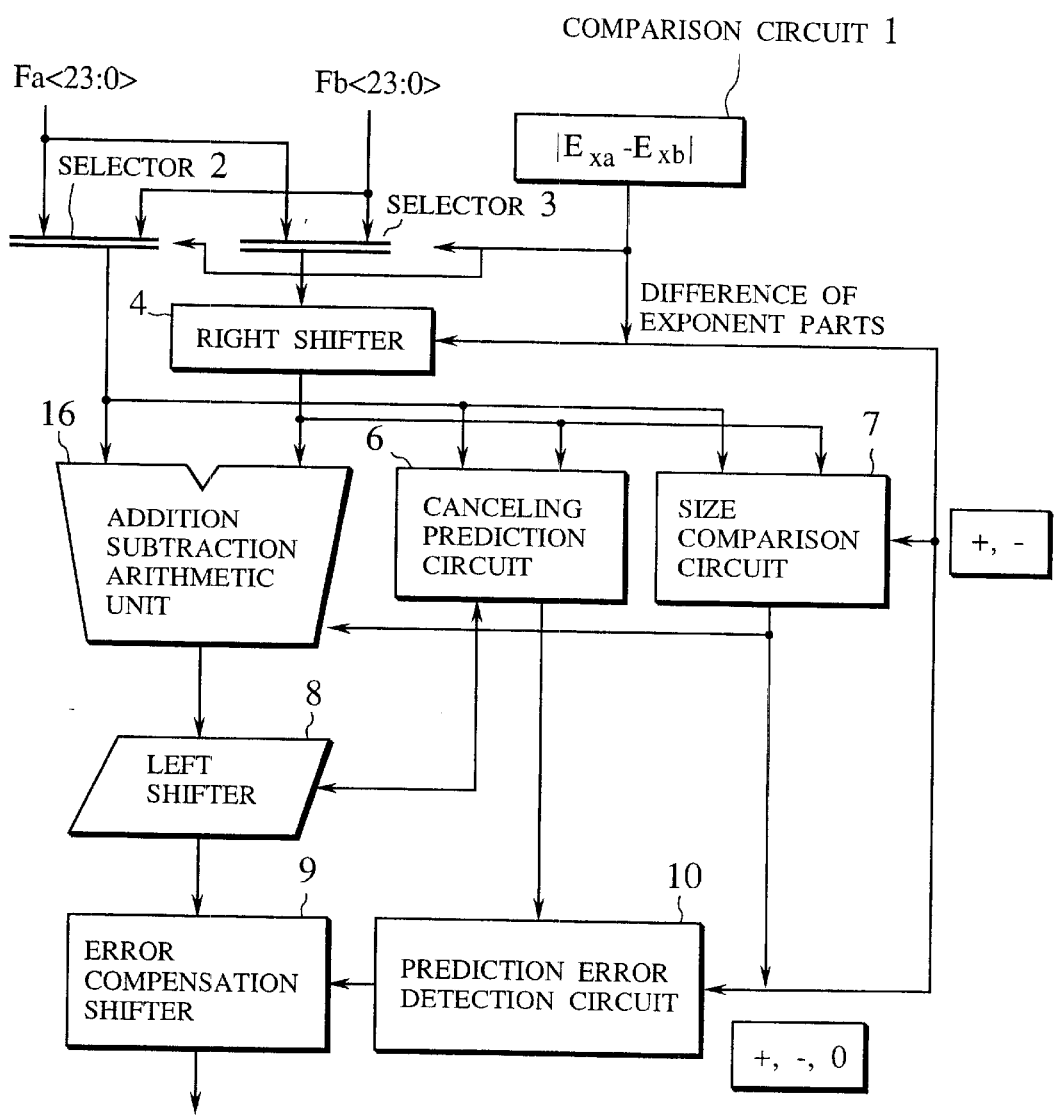
FIG. 2 is a block diagram showing a configuration example of a conventional floating point execution unit.
Figure 3:
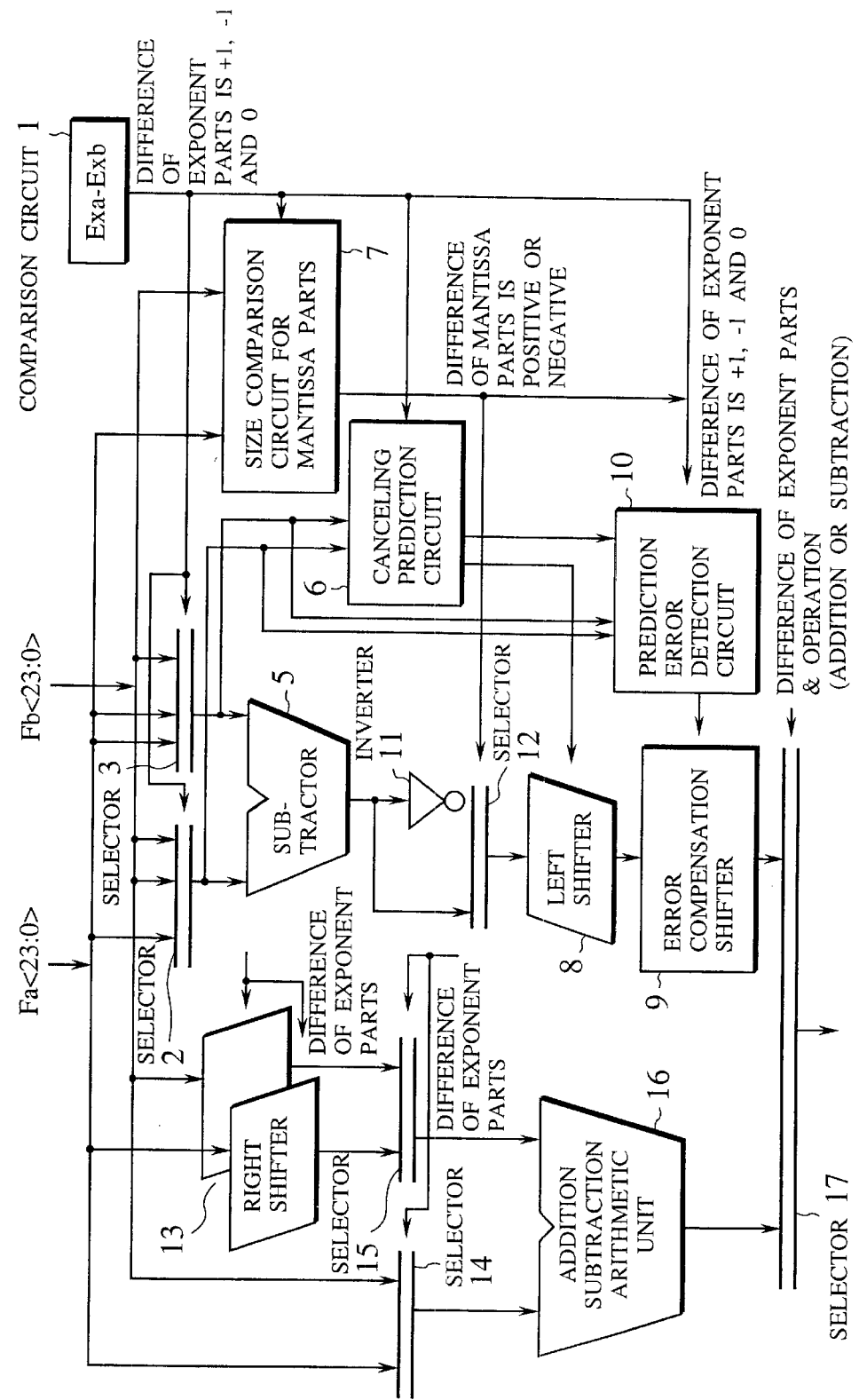
FIG. 3 is a block diagram showing a configuration example of another conventional floating point execution unit.
Figure 6:
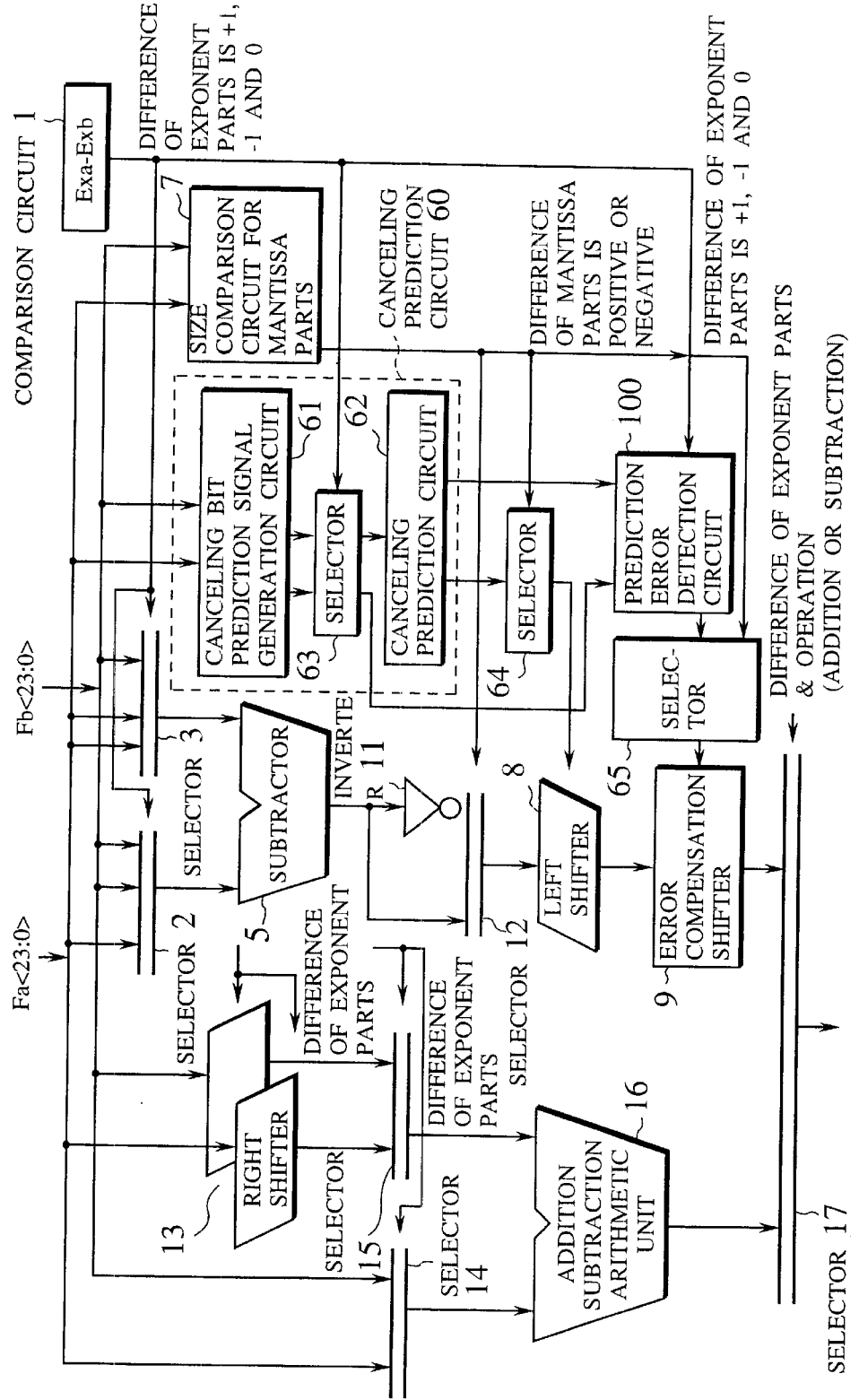
FIG. 6 is a block diagram showing a configuration of a floating point execution unit as the first embodiment of the present invention.

FIG. 6 is a block diagram showing a configuration of a floating point execution unit as the first embodiment of the present invention. In the following explanation, the same components between the floating point execution unit of the present invention and the conventional floating point execution units shown in FIG. 2 and FIG. 3 will be referred by the same reference numbers. In addition, the explanation for the same components will be omitted here.

The floating point execution unit of the first embodiment comprises the comparison circuit 1 for performing the size of the exponent parts of two operands; the selectors 2 and 3 for selecting whether the right shifting for one of the two operands is executed or not; the subtraction unit 5 for subtracting of the two operands after the alignment; a canceling prediction circuit 60 comprising a canceling bit prediction signal generation circuit 61 and a canceling bit position determination circuit 62; a mantissa part size comparison circuit 7 for comparing the size of the mantissa parts in two operands; the left shifter 8 for shifting the subtraction result to normalize it; the error compensation shifter 9 for compensating the one bit error in the subtraction result that has been normalized by the left shifting; a prediction error detection circuit 100 for detecting the one bit error in the canceling prediction; the inverter 11 for inverting the subtraction result from the subtraction unit 5; the selector 12 for selecting one of the subtraction result from the subtraction unit 5 and the inverted result; and the selector 17 for selecting one of the outputs from the addition subtraction unit 16 and the subtraction unit 5.

Figure 7:
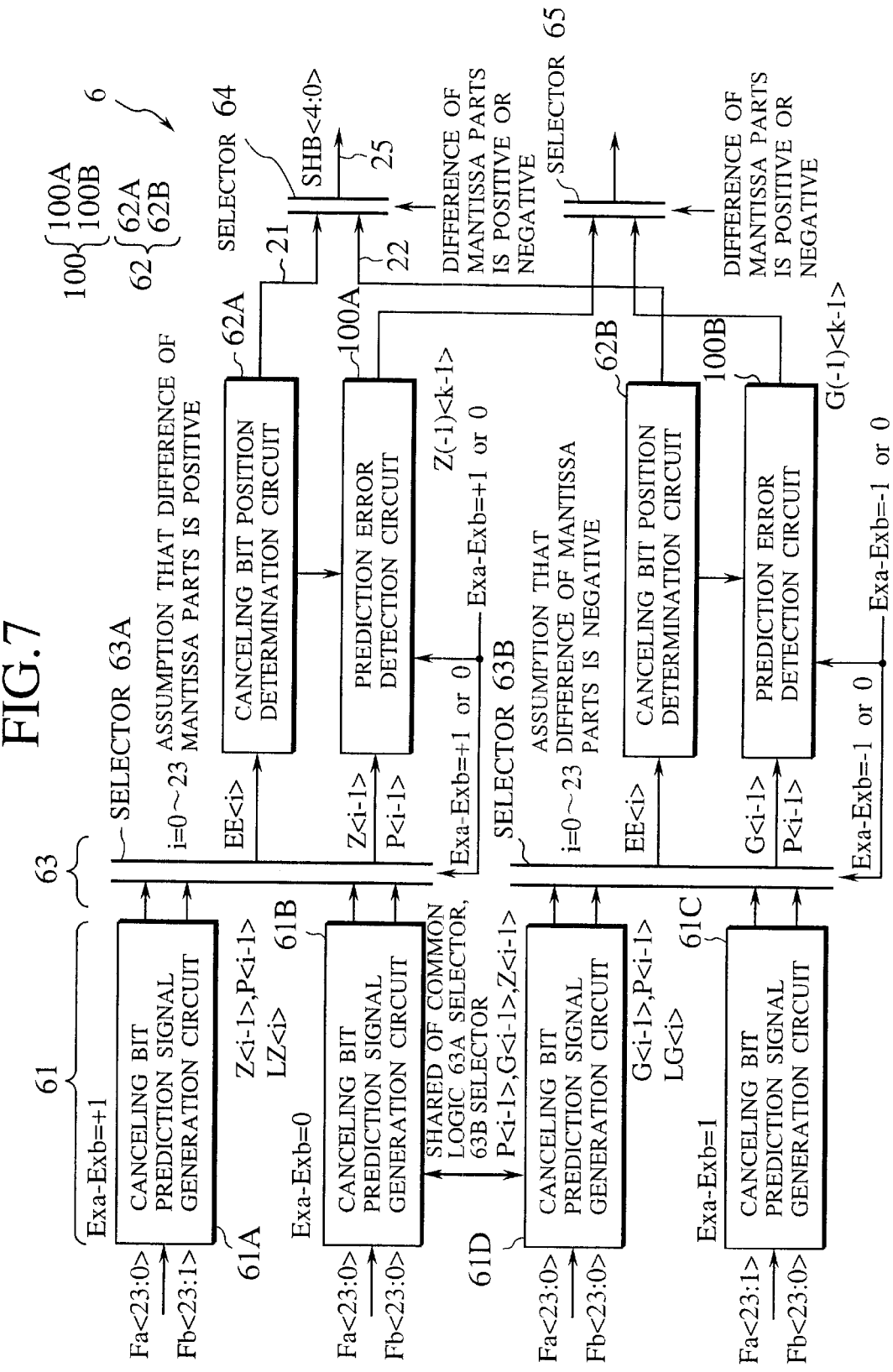
FIG. 7 is a block diagram showing a detailed configuration of a canceling prediction circuit and a prediction error detection circuit shown in FIG. 6.

FIG. 7 is a block diagram showing a detailed configuration of the canceling bit prediction signal generation circuit 61 and the canceling bit prediction position determination circuit 62 shown in FIG. 6;

The canceling bit prediction signal generation circuit 61 comprises canceling bit prediction generation circuits 61A, 61B, 61C, and 61D. The selector 63 comprises selectors 63A and 63B. The selector 63A selects one of outputs from the canceling bit prediction generation circuits 61A and 61B. The selector 63B selects one of outputs from the canceling bit prediction generation circuits 61C and 61D.

The canceling bit position determination circuit 62 comprises canceling bit position determination circuits 62A and 62B. The prediction error detection circuit 100 comprises prediction error detection circuits 100A and 100B. The selector 64 selects one of the canceling bit position determination circuits 62A and 62B. The selector 65 selects one of the prediction error detection circuits 100A and 100B.

Next, a description will be given of the operation of the floating point execution unit according to the first embodiment.

In the following explanation, the floating point execution unit is a single precision and will execute a subtraction of operands a and b.

The mantissa parts in the two operands a and b are Fa<23:0> and Fb<23:0> and the exponent parts thereof are Exa and Exb. Where, each of Fa<23> and Fb<23> mean the value "1" in the floating point representation. That is, in the following explanation, Fa<23>>=Fb<23>>=1.

A canceling amount of a mantissa part after arithmetic operation of addition or subtraction in which a difference of exponent parts is not less than 2 is within at most one bit. In this case, because it is therefore not necessary to use any canceling prediction circuit, the operation flow uses the following units: The right shifter 13; the selectors 14 and 15; addition subtraction unit 16; and the selector 17.

On the contrary, when a subtraction in which a difference of exponent parts is not less than 1 is executed, the operation flow uses the following units: The selectors 2 and 3; The subtraction unit 5; the canceling prediction circuit 60; the selector 64; the prediction error detection circuit 100; the selector 65; the inverter 11; the selector 12; the left shifter 8; the error compensation shifter 9; and the selector 17.

In the floating point execution unit of the present invention, the canceling prediction circuit 60 inputs the two operands before the operation for the two operands by both the selectors 2 and 3 (that is, before an alignment process).

In the conventional floating point execution units, both the canceling prediction circuit and the prediction error detection circuit must input signals only after the comparison operation of exponent parts by the comparison circuit 1 and the selectors 2 and 3 is completed.

On the contrary, in the present invention, the operation of the canceling prediction circuit 60 and the comparison operation for exponent parts by the comparison circuit 1 can be executed simultaneously. Thus, the comparison operation for the exponent parts and the operation of the prediction error detection circuit 100 can also be executed in parallel.

Here, a brief operation of the canceling prediction circuit 60 and the prediction error detection circuit 100 will be explained. As shown in FIG. 7, the two operands Fa<23:0> and Fb<23:0> before the alignment are supplied to the canceling bit prediction signal generation circuits 61A, 61B, 61C, and 61D. Each of the canceling bit prediction signal generation circuits 61A, 61B, 61C, and 61D generates a canceling bit prediction signal. At this time, each of the selectors 63A and 63B in the selector 63 selects one of the canceling bit prediction signal generation circuits 61A, 61B, 61C, and 61D based on the size of the exponent parts in the two operands and then outputs the selected canceling bit prediction signal to one of the canceling bit position determination circuit 62A and 62B.

After this operation, based on the difference of the mantissa parts in the operands, the selector 64 selects one of the canceling bit position determination signal from the canceling bit position determination circuits 62A and 62B, and outputs the selected one to the left shifter 8 shown in FIG. 6.

For example, when the difference of the exponent parts in the two operands is the value "+1" and the difference of the mantissa parts is a positive number, the selector 64 selects the canceling bit position signal (SHB<4:0>) that has been determined by the canceling bit position determination circuit 62A based on the canceling bit prediction signal generated by the canceling bit prediction signal generation circuit 61A, and then outputs the selected canceling bit position signal (SHB<4:0>) to the left shifter 8.

On the other hand, the prediction error detection circuit 100A detects whether or not there is any error in the canceling bit prediction based on the canceling bit position determination information from the canceling bit position determination circuit 62A. Similarly, the prediction error detection circuit 100B detects wether or not there is any error in the canceling bit prediction based on the canceling bit position determination information from the canceling bit position determination circuit 62B.

After this operation, selector 65 selects one of the detection information of the canceling bit prediction error by the prediction error detection circuits 100A and 100B based on the sign of the difference of the mantissa parts in the two operands and then outputs the selected one to the error compensation shifter 9.

The canceling bit prediction signal generation circuit 61 comprises four canceling bit prediction signal generation circuits 61A, 61B, 61C, and 61D. The canceling bit prediction signal generation circuit 61A checks continuous two bits in bit sequences to be compared and then predicts whether or not a canceling occurs. It must be required to know the size of the mantissa parts in two operands to be compared before the canceling bit prediction signal generation circuit 61 is used.

When the difference of the exponent parts in the operands is the value "+1" or the value "−1", the mantissa part in the operand having the small exponent part must be shifted rightward by one bit. Accordingly, because it is thereby possible to know the size of the mantissa parts, both the canceling bit prediction signal generation circuits 61A and 61C input bit sequences of the mantissa parts based on the size of the mantissa parts.

On the other hand, when the difference of the exponent parts is zero, the size of the mantissa parts is determined by performing the comparison of these mantissa parts. However, the total execution time of the floating point execution unit is increased by the execution time for the comparison operation of the size of the mantissa parts. In order to avoid this drawback, the floating point execution unit performs the two kinds of the canceling prediction processes in which the size of the mantissa parts is assumed.

That is to say, the two canceling bit prediction signal generation circuits 61B and 61D are incorporated. The canceling bit prediction signal generation circuit 61B inputs the operands under the assumption of Fa$\geqq$Fb and the canceling bit prediction signal generation circuit 61D inputs the operands under the assumption of Fb$\geqq$Fa. In the example shown in FIG. 7, both the canceling bit prediction error signal generation circuits 61A and 61B (see the upper section shown in FIG. 7), the canceling bit position determination circuits 62A, and the prediction error detection circuit 100A perform under the assumption that the difference of the mantissa parts is positive.

On the other hand, both the canceling bit prediction error signal generation circuits 61C and 61D (see lower section in FIG. 7), the canceling bit position determination circuits 62B, and the prediction error detection circuit 100B perform under the assumption that the difference of the mantissa parts is negative.

The selector 63A selects the output signals from the two canceling bit prediction circuits 61A and 61B based on the selection control signal indicating the difference (Exa−Exb) of the exponent parts in the operands.

The selector 63B selects the output signals from the two canceling bit prediction circuits 61C and 61D based on the selection control signal indicating the difference (Exa−Exb) of the exponent parts in the operands.

The selection of the output signals from the two canceling bit prediction signal generation circuits 61A and 61B located in the upper two blocks shown in FIG. 7 is determined when the difference (Exa−Exb) of the exponent parts is zero or +1. The selector 63A selects the canceling bit prediction signal EE<i>, the signal P<i−1>, and the signal Z<i−1>. Where, i=0 to 23, P and Z signals will be used for prediction error detection operation.

In usual prediction error detection processes, only the pair of the signals P and G, or the pair of the signals P and Z is used. According to the symmetry of the circuits shown in FIG. 7, when the difference of the mantissa parts or the assumption of the difference is positive, the pair of the signals P and Z is used, when negative, the pair of the signals P and G is used.

The canceling bit position determination circuits 62A and 62B convert the canceling bit prediction signals generated by the canceling bit prediction signal generation circuits 61A, 61B, 61C, and 61D to numeric values and the prediction error detection circuits 100A and 100B detect a prediction error simultaneously.

The reason why the two canceling bit position determination circuits 62A and 62B, and the two prediction error detection circuits 100A and 100B are incorporated in the canceling prediction circuit 60 and the prediction error detection circuit 100 shown in FIG. 7 is to consider the case in which the difference of the exponent parts is zero. That is to say, when the difference of the exponent parts is zero, it is impossible to determine the size of the mantissa parts before the generation of the canceling bit prediction signal without comparing the mantissa parts. Accordingly, both the canceling bit prediction signal generation circuits 61B and 61D generate two kinds of canceling bit prediction signals under the assumption of the difference of the mantissa parts. Both the canceling bit position determination circuits 62A and 62B and both the prediction error detection circuits 100A and 100B are incorporated under this assumption.

When the difference of the exponent parts is the value "+1" or the value "−1". the size of the mantissa parts can be determined because one of the mantissa parts must be shifted rightward. In this case, it is possible to incorporate one canceling bit position determination circuit 62 and one prediction error detection circuit 100.

This configuration shares these hardware 62 and 100 in the case that the difference of the exponent parts is zero.

In the configuration of the floating point execution unit of the first embodiment, the canceling bit position determination circuit 62A and the prediction error detection circuit 100A are used when the difference of the exponent parts is the value "+1" or when the difference of the exponent parts is the value "+0" and the difference of the mantissa parts, and the canceling bit position determination circuit 62B and the prediction error detection circuit 100B are used when the difference of the exponent parts is the values "−1" or when the difference of the exponent parts in the value "+0" and the difference of the mantissa parts is assumed as negative. In addition, both the selectors 63A and 63B switch the paths, whose components are described above, according to the difference of the exponent parts.

That is to say, the selector 63A selects the path when the difference of the exponent parts is the value "+1" or zero, and the selector 63B selects the path when the difference of the exponent parts is the value "−1" or zero.

The selector 64 selects one of the canceling bit amounts SHB<4:0> (indicated by the reference numbers 21 and 22 shown in FIG. 7) output from the two canceling bit position determination circuits 62A and 62B. The selector 65 selects one of the prediction error detection signals output from the prediction error detection circuits 100A and 100B.

Finally, the final canceling bit amount SHB<4:0> (indicated by the reference number 25 shown in FIG. 7) and the prediction error detection circuit to be selected are determined based on the sign (that is a positive value or a negative value) of the difference of the mantissa parts. In the above explanation, although the difference (a positive value or a negative value) of the mantissa parts is used as the control signal, it is possible to use the logical sum ("OR" operation) between the "+1" or "−1" as the control signal. An example is following:

(Upper blocks 61A and 61B shown in FIG. 7 are selected)=(Difference of mantissa parts is positive) or (Difference of exponent parts is "+1");

and (Lower blocks 61C and 61D shown in FIG. 7 are selected)=(Difference of mantissa parts is negative) or (Difference of exponent parts is "−1").

Next, a description will be given of the detailed configuration of each block (the canceling bit prediction signal generation circuits 61A, 61B, 61C, and 61D, the canceling bit position determination circuits 62A and 62B, and the prediction error detection circuits 100A and 100B shown in FIG. 7) and the detailed operation with reference to FIGS. 8 and 9.

[1] The Canceling Bit Prediction Signal Generation Circuit

First, the operation of the canceling bit prediction signal generation circuit 61 shown in FIG. 7 will be explained. In this case, the subtraction (a−b) of the two floating point numbers "a" and "b" is considered. Where, Exa and Exb indicate the exponent parts of the floating point numbers "a" and "b" (as operands), respectively, Fa<22:0> and Fb<22:0> designate mantissa parts of the floating point numbers a and b. In usual cases, because the Fa<23>=1 and Fb<23>=1 are included in the mantissa parts, the symbols Fa<23:0> and Fb<23:0> indicate the mantissa parts in the floating point numbers "a" and "b", respectively. In addition, FaX<23:0>, FbX<23:0>, GX<23:0>, PX<23:0>, and ZX<23:0> are obtained by inverting each bit of the Fa<23:0>, Fb<23:0>, G<23:0>, P<23:0>, and Z<23:0>.

As described above, because the absolute value of the difference of the exponent parts is less than 2, following logic is formed based on the difference of the exponent parts.

(I) When the difference of exponent parts is +1

(Exa−Exb=1)

Because it is necessary to shift Fb rightward by one bit, the following signals are defined:

i<23,

G<i>=(Fa<i>) and (FbX<i+1>);

P<i>=(Fa<i>) xor (FbX<i+1>);

and

Z<i>=(FaX<i>) and (Fb<i+1>).

In addition, G<23>=1, Z<23>=P<23>=0; and

Z<−1>=Fb<0>, G<−1>=0, and P<−1>=FbX<0>.

Since the subtraction result is always positive, the canceling bit prediction signal EE<i> is:

EE<i>=(PX<i>) and (ZX<i−1>), (This logic EE<i> is defined as EE<i>=LZ<i>).

(IIa) When the difference of exponent parts is zero and the difference of mantissa parts is positive (Exa−Exb=0 and Fa−Fb>0)

In this case, since it is not necessary to shift any mantissa part, the following signals are defined:

i<23,

G<i>=(Fa<i>) and (FbX<i>);

P<i>=(Fa<i>) xor (FbX<i>);

and

Z<i>=(FaX<i>) and (Fb<i>).

In addition, P<23>=1, G<23>=Z<23>=0; and

Z<−1>=0, G<−1>=0, and P<−1>=1.

Since it is assumed that the subtraction result becomes positive, the canceling bit prediction signal EE<i> is:

EE<i>=(PX<i>) and (ZX<i−1>), (where, this logic EE<i> is defined as EE<i>=LZ<i>).

(IIb) When the difference of exponent parts is zero and the difference of mantissa parts is negative (Exa−Exb=0 and Fa−Fb<0)

In this case, since it is not necessary to shift any mantissa part, the following signals are defined:

$i<23$, $G<i>=(Fa<i>)$ and $(FbX<i>)$;

$P<i>=(Fa<i>)$ xor $(FbX<i>)$;

and $Z<i>=(FaX<i>)$ and $(Fb<i>)$.

In addition, $P<23>=1$, $G<23>=Z<23>=0$; and $Z<-1>=0$, $G<-1>=0$, and $P<-1>=1$.

Because it is assumed that the subtraction result becomes negative, the canceling bit prediction signal EE<i> becomes:

$EE<i>=(PX<i>)$ and $(GX<i-1>)$, (where, this logic $EE<i>$ is defined as $EE<i>=LG<i>$).

Because logic of generation for G<i>, P<i>, and Z<i> is same in the cases IIa and IIb, the common logic can be used.

(III) When the difference of exponent parts is −1 (Exa−Exb=−1)

In this case, since it is necessary to shift the mantissa part Fa rightward by one bit, the following signals are defined:

$i<23$, $G<i>=(FbX<i>)$ and $(Fa<i+1>)$;

$P<i>=(FbX<i>)$ xor $(Fa<i+1>)$;

and $Z<i>=(Fb<i>)$ and $(FaX<i+1>)$.

In addition, $Z<23>=1$, $G<23>=P<23>=0$; and $G<-1>=Fa<0>$, $Z<-1>=0$, and $P<-1>=FaX<0>$.

Since the subtraction result is always negative, the canceling bit prediction signal EE<i> becomes:

$EE<i>=(PX<i>)$ and $(GX<i-1>)$, (where, this logic $EE<i>$ is defined as $EE<i>=LG<i>$).

[2] Selectors 63A and 63B

While the exponent parts are compared, the canceling bit prediction signal generation circuits 61A, 61B, 61C, and 61D generate LZ<i>, LG<i>, P<i−1>, G<i−1>, and Z<i−1>. As shown in FIG. 7, the selectors 63A and 63B select one of the above signals based on the comparison result of the exponent parts.

That is to say, the signals LZ<i>, P<i−1>, and Z<i−1> in each of the two cases where the difference of the exponent parts is +1 (Exa−Exb=+1), and the difference of the exponent parts is zero and the difference of the mantissa parts is positive (Exa−Exb=0 and Fa>Fb), and then one of the results is selected based on the difference (Exa−Exb) in the configuration shown in FIG. 7.

On the other hand, the signals LG<i>, P<i−1>, and G<i−1> in each of the two cases where the difference of the exponent parts is −1 (Exa−Exb=−1), and the difference of the exponent parts is zero and the difference of mantissa parts is positive (Exa−Exb=0 and Fa>Fb), and then one of the results is selected based on the difference (Exa−Exb) in the configuration shown in FIG. 7.

[3] Canceling Bit Position Determination Circuits 62A and 62B

The canceling bit is the most significant bit in the bit sequence of 1 in the canceling bit prediction signal. Each of the canceling bit position determination circuits 62A and 62B comprises a priority encoder to detect the canceling bit position. Each of the canceling bit position determination circuits 62A and 62B converts the canceling bit position to a binary numerical value. The value SHB<4:0> of five bits indicates the canceling bit position.

[4] Prediction Error Detection Circuits 100A and 100B

The prediction error detection circuits 100A and 100B specify a carry signal (or a borrow signal in subtraction) at the bit at which the occurrence of the canceling is predicted by the canceling bit position determination circuits 62A and 62B and then perform the prediction error detection based on the carry signal.

The prediction error detection circuit 100 (consisting of the circuits 100A and 100B) uses an intermediate logic from the canceling bit position determination circuit 62 (consisting of the circuits 62A and 62B). That is to say, the selection of the P signal and the G signal (or the Z signal) by the canceling error detection circuit 100 is executed based on the intermediate logic result from the canceling bit position determination circuits 62A and 62B. Then, the prediction error detection circuit 100 selects the final carry signal at the bit specified by the canceling bit determination circuits 62A and 62B. First, before the explanation of the operation of the prediction error detection circuit 100, the logic of signals are defined.

$P(k)<k>=P<k>$;

$G(k)<k>=G<k>$;

$Z(k)<k>=Z<k>$;

$P(k)<k+1>=(P(k+1)<k+1>)$ and $(P(k)<k>)$;

$G(k)<k+1>=(G(k+1)<k+1>)$ or $\{(P(k+1)<k+1>)$ and $(G(k)<k>)\}$;

$Z(k)<k+1>=(Z(k+1)<k+1>)$ or $\{(P(k+1)<k+1>)$ and $(Z(k)<k>)\}$;

$P(m)<k>=(P(n)<k>)$ and $(P(m)<n-1>)(m<n<k)$;

$G(m)<k>=(G(n)<k>)$ or $\{(P(n)<k>)$ and $(G(m)<n-1>)\}(m<n<k)$;

$Z(m)<k>=(Z(n)<k>)$ or $\{(P(n)<k>)$ and $(Z(m)<n-1>)\}(m<n<k)$;

where, $(P(m)<k>)$ and $(G(m)<k>)=G(m)<k>$ and $(Z(m)<k>)=(P(m)<k>)$ and $(Z(m)<k>)=0$; and $(P(m)<k>)$ or $(G(m)<k>)$ or $(Z(m)<k>)=1$.

It can be recognized that G(m)<k>, P(m)<k>, Z(m)<k> are carry generation signal, a carry propagation signal, and a zero signal, respectively, in usual carry lookahead adder unit.

Figure 8:
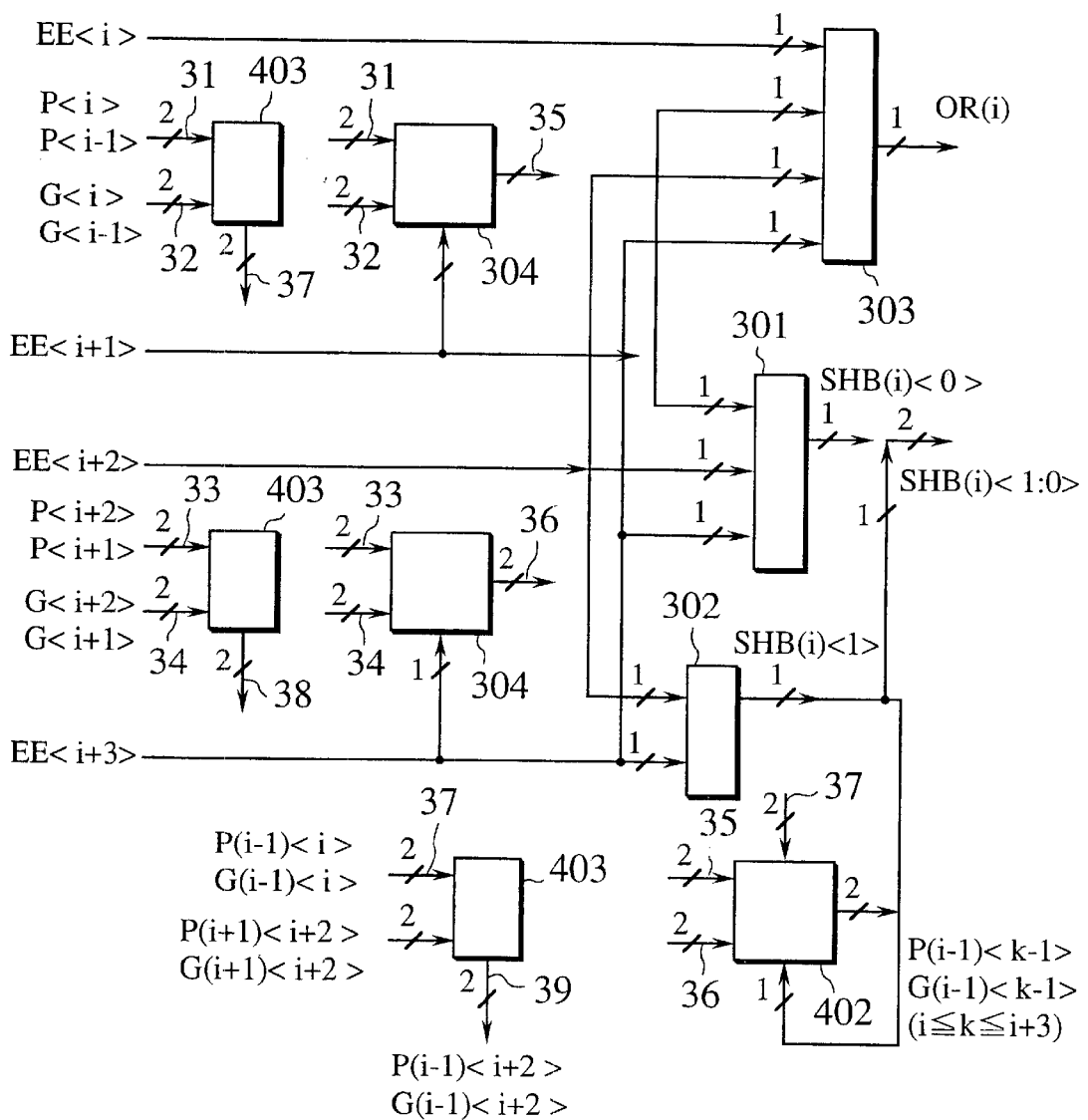
FIG. 8 is a block diagram showing a configuration of a canceling bit position detection circuit for 4 bits and the prediction error detection circuit.

FIG. 8 is a block diagram showing a configuration of the canceling bit position detection circuit for 4 bits and the prediction error detection circuit.

A description will be given of the generation logic for the canceling bit prediction signal of four bits, the P signal, and the G signal (or the Z signal).

The content of the Z signal can be explained by using the explanation for the G signal because a relationship of these signals has the symmetry, and only for the G signal will be therefore explained.

First, the canceling bit prediction signal of four bits, the P signal, and the G signal are defined as EE<i+3: i>, P<i+2: i−1>, and G<i+2: i−1>, respectively.

The canceling bit determination circuit of four bits has the same logic of the priority encoder of four bits. The logic of the priority encoder of four bits is as follows.

When EEX is an inverted logic of EE, the following relationships can be generated in the priority encoder 301, the priority encoder 302, and the logical sum circuit 303 shown in FIG. 8:

$SHB(i)<0>=\{EE<i+1> \text{ and } EEX<i+2>\} \text{ or } EE<i+3>;$ $SHB(i)<1>=\{EE<i+2> \text{ or } EE<i+3>\};$ and $OR(i)=EE<i> \text{ or } EE<i+1> \text{ or } EE<i+2> \text{ or } EE<i+3>.$ In the prediction error detection logic, if the k-th bit ($i \leq K \leq i+3$) is the most significant bit satisfying the EE<K>="1", P(i−1)<K−1> and G(i−1)<K−1> are output as the P signal and the G signal, respectively.

If EE<K> "0" under ($i \leq K \leq i+3$), OR(i)=0 is output and P(i−1)<i−1> and G(i−1)<i−1> are output as the P signal and the G signal, respectively.

The P signal and the G signal to be used for the prediction error detection operation are made based on the propagation from the (i−1)th bit in the blocks shown in FIG. 8.

That is to say, $P(i-1)<i-1>=P<i-1>;$ $G(i-1)<i-1>=G<i-1>;$ $P(i-1)<i>=(P<i>) \text{ and } (P<i-1>);$ $G(i-1)<i>=(G<i>) \text{ or } \{(P<i>) \text{ and } (G<i-1>)\};$ $P(i-1)<i+1>=(P<i+1>) \text{ and } (P(i-1)<i>);$ $G(i-1)<i+1>=(G<i+1>) \text{ or } \{(P<i+1>) \text{ and } (G(i-1)<i>)\};$ $P(i-1)<i+2>=(P(i+1)<i+2>) \text{ and } (P(i-1)<i>);$ $G(i-1)<i+2>=(G(i+1)<i+2>) \text{ or } \{(P(i+1)<i+2>) \text{ and } (G(i-1)<i>)\}.$ In order to realize the above logic, the configuration shown in FIG. 8 has the hierarchies every two bits. In addition, because the canceling bit prediction signals EE<i+3; i+1> are used as the selection control signal, it is possible to perform both the selection operation and the carry propagation. That is to say, the carry propagation circuit 403, the carry propagation and selection circuit 304 and 402 are correspond to the prediction error detection circuit of four bits.

When the i-th bit and the (I+1)th bit are observed, the carry propagation circuit and selection circuit 304 outputs following P and G signals, indicated by the reference number 35 shown in FIG. 8, by inputting the EE<i+1> as a selection control signal shown in FIG. 8.

When EE<i+1>="1" (L=i+1), $P(i-1)<L>=(P<i>) \text{ and } (P<i-1>);$ and $G(i-1)<L>=(G<i>) \text{ or } \{(P<i>) \text{ and } (G<i-1>)\}.$ When EE<i+1>="0" (L=i), $P(i-1)<L>=P<i-1>;$ and $G(i-1)<L>=G<i-1>.$ Similarly, when the (i+2)th bit and the (i+3)th bit are observed, the carry propagation circuit and selection circuit 304 outputs following P and G signals indicated by the reference number 36 shown in FIG. 8 by inputting the EE<i+3> as a selection control signal shown in FIG. 8.

When EE<i+3>="1" (H=i+3), $P(i+1)<H>=(P<i+2>) \text{ and } (P<i+1>);$ and $G(i+1)<H>=(G<i+2>) \text{ or } \{(P<i+2>) \text{ and } (G<i+1>)\}.$ When EE<i+3>="0" (H=i+2), $P(i+1)<H>=P<i+1>;$ and $G(i+1)<H>=G<i+>.$ Next, the carry propagation circuit and selection circuit 402 as the following stage generates and outputs the following P and G signals by inputting the SHB(i)<1> as a selection control signal shown in FIG. 8.

When SHB(i)<1>="1" (K=H), $P(i-1)<K>(P(i+1)<H>) \text{ and } (P(i-1)<i>);$ and $G(i-1)<K>(G(i+1)<H>) \text{ or } \{(P(i+1)<H>) \text{ and } (G(i-1)<i>)\}.$ When SHB(i)<1>="0" (K=L), $P(i-1)<K>=(P(i-1)<L>);$ and $G(i-1)<K>=(G(i-1)<L>).$ The carry propagation circuit 403 (see FIG. 8) generates and propagates a carry at the (i−1)th bit to the (I+2)th bit. This carry propagation circuit 403 has the hierarchy structure every two bits. The carry propagation circuit 403 generates the signals of P(i−1)<i+2>, G(i−1)<i+2> designated by the reference character 39 shown in FIG. 8.

Figure 9:
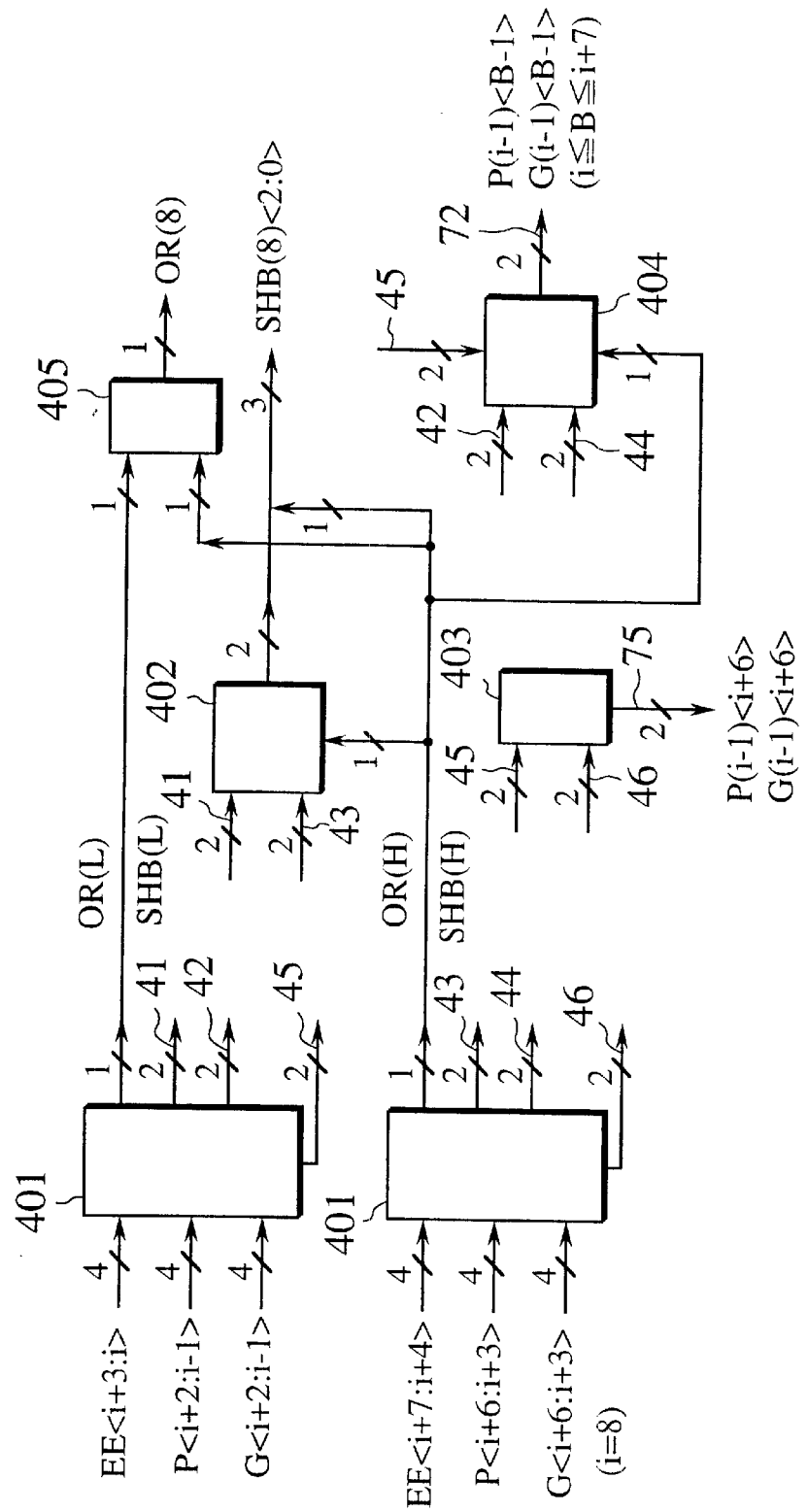
FIG. 9 is a block diagram showing a configuration of a canceling bit position detection circuit for 8 bits and the prediction error detection circuit.
Figure 10:
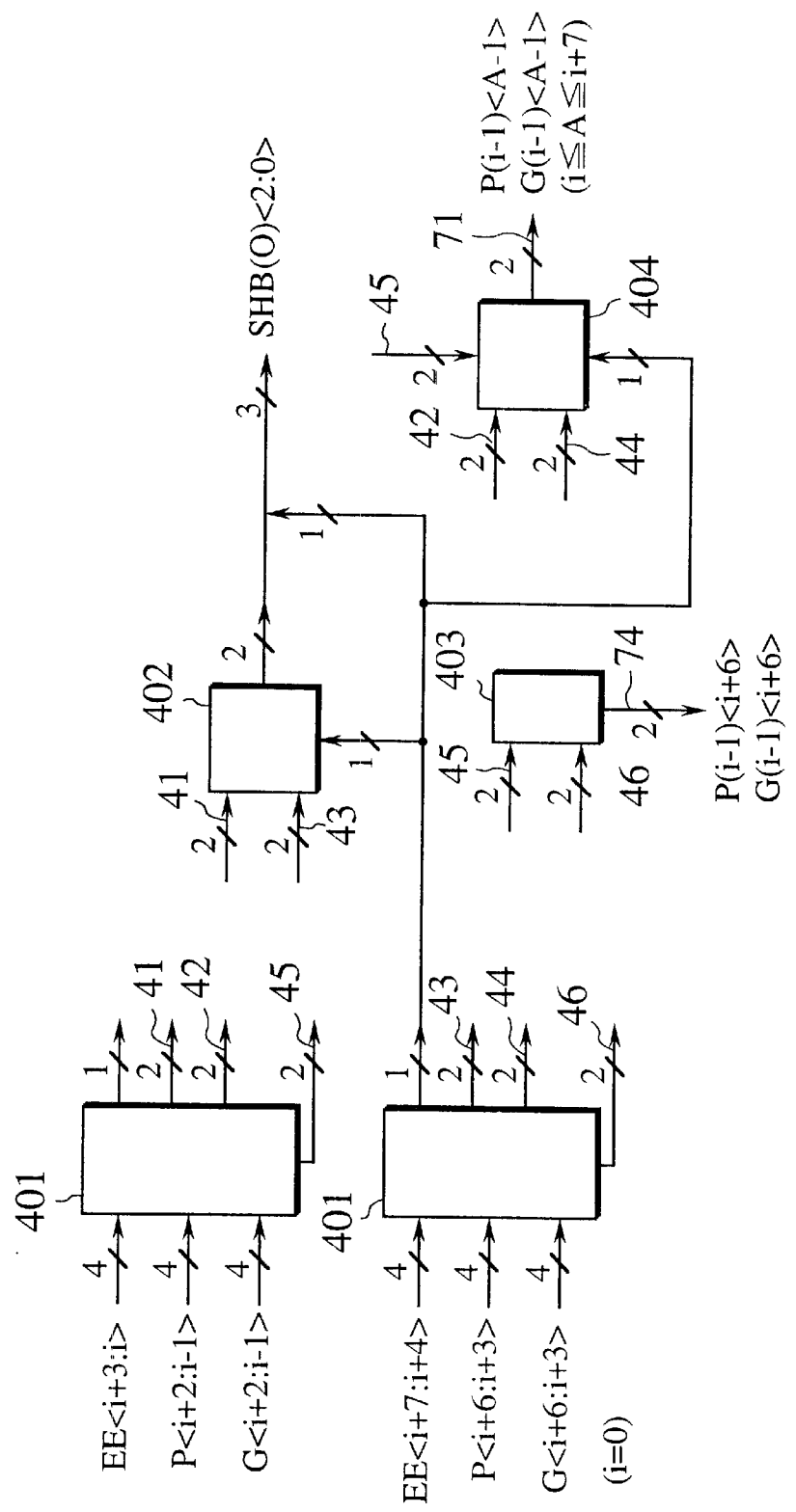
FIG. 10 is a block diagram showing another configuration of a canceling bit position detection circuit for 8 bits and the prediction error detection circuit.
Figure 11:
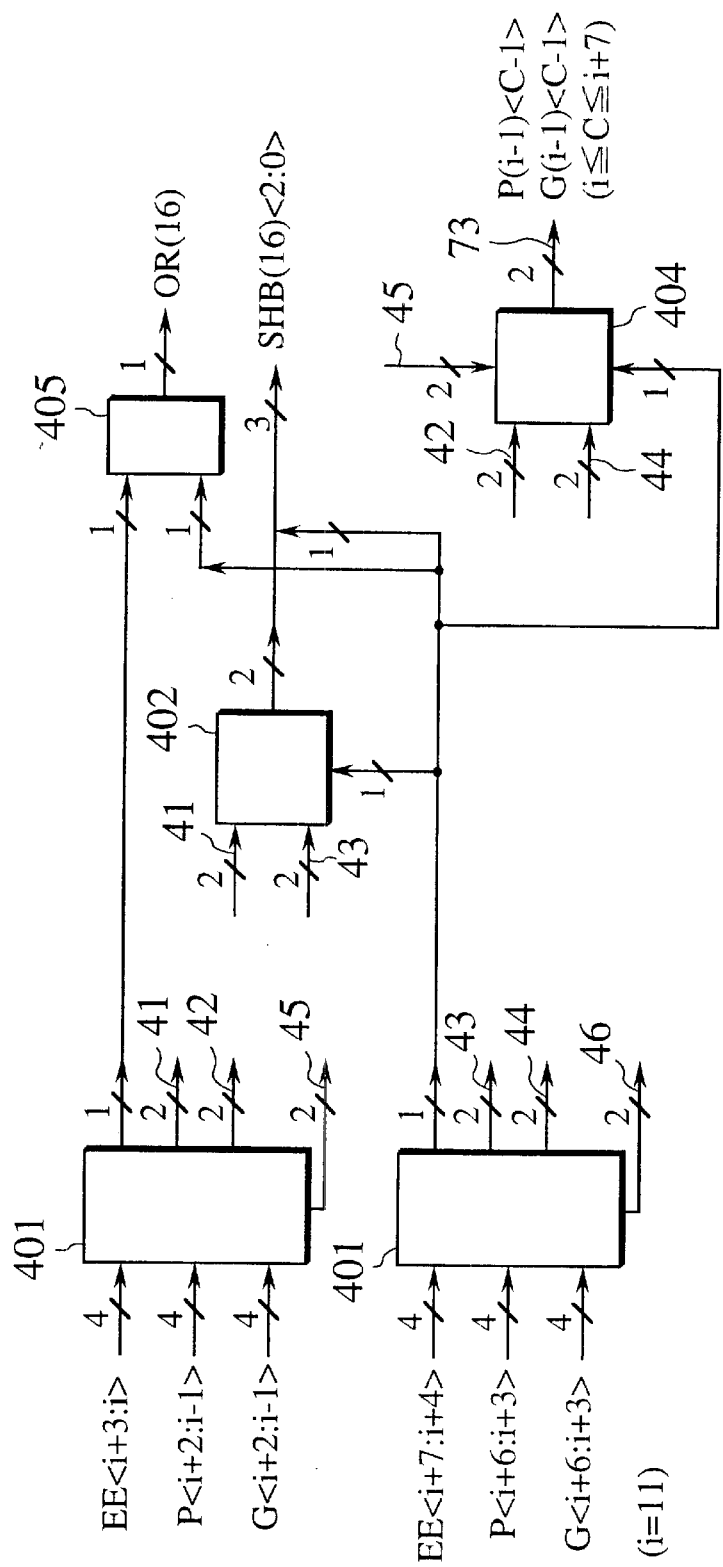
FIG. 11 is a block diagram showing another configuration of a canceling bit position detection circuit for 8 bits and the prediction error detection circuit.

FIG. 9 is a block diagram showing a configuration of the canceling bit position detection circuit for 8 bits (as a priority encoder) and the prediction error detection circuit. FIG. 10 is a block diagram showing another configuration of the canceling bit position detection circuit for 8 bits and the prediction error detection circuit. FIG. 11 is a block diagram showing another configuration of the canceling bit position detection circuit for 8 bits and the prediction error detection circuit.

Because each of the canceling bit position detection circuits for 8 bits (a priority encoder) and the prediction error detection circuits shown in FIGS. 9, 10, and 11 has the same configuration (some blocks that are not necessary for the following explanation are omitted here), the following explanation will use only the configuration shown in FIG. 9.

The canceling bit position determination circuit for 8 bits comprises:

A pair of blocks, each includes the canceling bit position determination circuit for 4 bits and prediction error detection circuit 401;

The selection circuit 402;

The carry propagation circuit 403; and

The carry propagation circuit and the selection circuit 404.

When the canceling bit prediction signal is EE<i+7: i>, and P and G signals are P<i+6: i−1> and G<i+6: i−1>. That is to say, the configuration shown in FIG. 9 indicates the case of i=8, the configuration shown in FIG. 10 indicates the case of i=0, and the configuration shown in FIG. 11 indicates the case of i=16).

First, the canceling bit position determination circuit for 4 bits and prediction error detection circuit 401 that is located at upper block shown in FIG. 9 outputs SHB(H)<1:0> designated by the reference number 43, OR(H); P(i+3)<H−1>, G(i+3)<H−1> designated by the reference number 44. Where, i+4≦H≦i+7, and the H-th bit is the most significant bit of EE<H>="1".

On the other hand, the canceling bit position determination circuit for 4 bits and prediction error detection circuit 401 that is located at lower block shown in FIG. 9 outputs SHB(L)<1:0> designated by the reference number 41, OR(L); P(i−1)<L−1>, G(i−1)<L−1> designated by the reference number 42. Where, i≦L≦i+3, and the L-th bit is the most significant bit of EE<L>="1".

Each of the canceling bit position determination circuits for 4 bits and prediction error detection circuits 401 located at the upper side and the lower side in FIG. 9 outputs the following signals for carry propagation: P(i+3)<i+6>; G(i+3)<i+6> indicated by the reference number 46; P(i−1)<i+2>; and G(i−1)<i+2> designated by the reference number 45.

The selection circuit 402 inputs the OR (H) signal as the selection control signal and then selects one of the signal SHB(H)<1:0> designated by the reference number 43 and the signal SHB(L)<1:0> designated by the reference number 41.

When OR(H)="1", the signal SHB(H)<1:0> is selected, because the upper bit block 401 located at lower side in FIG.9 inputs the canceling bit prediction signal of the value "1". In this case, the selection circuit 402 outputs SHB(8)<2:0> as the output signal SHB(B)<2:0> from the block because SHB(H)<2>=OR<H>. On the other hand, when OR(H)="0", the signal SHB(L)<1:0> is selected. In this case, the selection circuit 402 outputs SHB(L)<2:0> as the output signal SHB(8)<2:0> from the block because SHB(L)<2>=OR<H>.

The carry propagation circuit and selection circuit 404 selects the P and G signals, which correspond to specified bits, based on the same manner described above. That is, when OR(H)="1", the block 404 selects the output signals P(i+3)<H−1> and G(i+3)<H−1> transferred from the upper stream block. In this case, in order to reflect the carry propagation from the (i−1)th bit, the following logic is obtained:

$P(i-1)<H-1>=P(i+3)<H-1>$ and $P(i-1)<i+2>$;

and $G(i-1)<H-1>=G(i+3)<H-1>$ or $\{P(i+3)<H-1>$ and $G(i-1)<i+2>\}$.

On the other hand, when OR(H)="0", the signals P(i−1)<L−1> and G(i−1)<L−1> are selected. In this case, because the carry propagation occurs from the (i−1)th bit, the signals P(i−1)<L−1> and G(i−1)<L−1> are selected without any change.

The carry propagation circuit 403 generates the P and G signals for the (i−1)th bit to the (i+6)th bit as propagation signals among blocks. That is, the carry propagation circuit 403 generates the following signals:

$P(i-1)<i+6>=P(i+3)<i30\ 6>$ and $P(i-1)<i+2>$;

and $G(i-1)<i+6>=G(i+3)<i+6>$ or $\{P(i+3)<i+6>$ and $G(i-1)<i+2>\}$.

Figure 12:
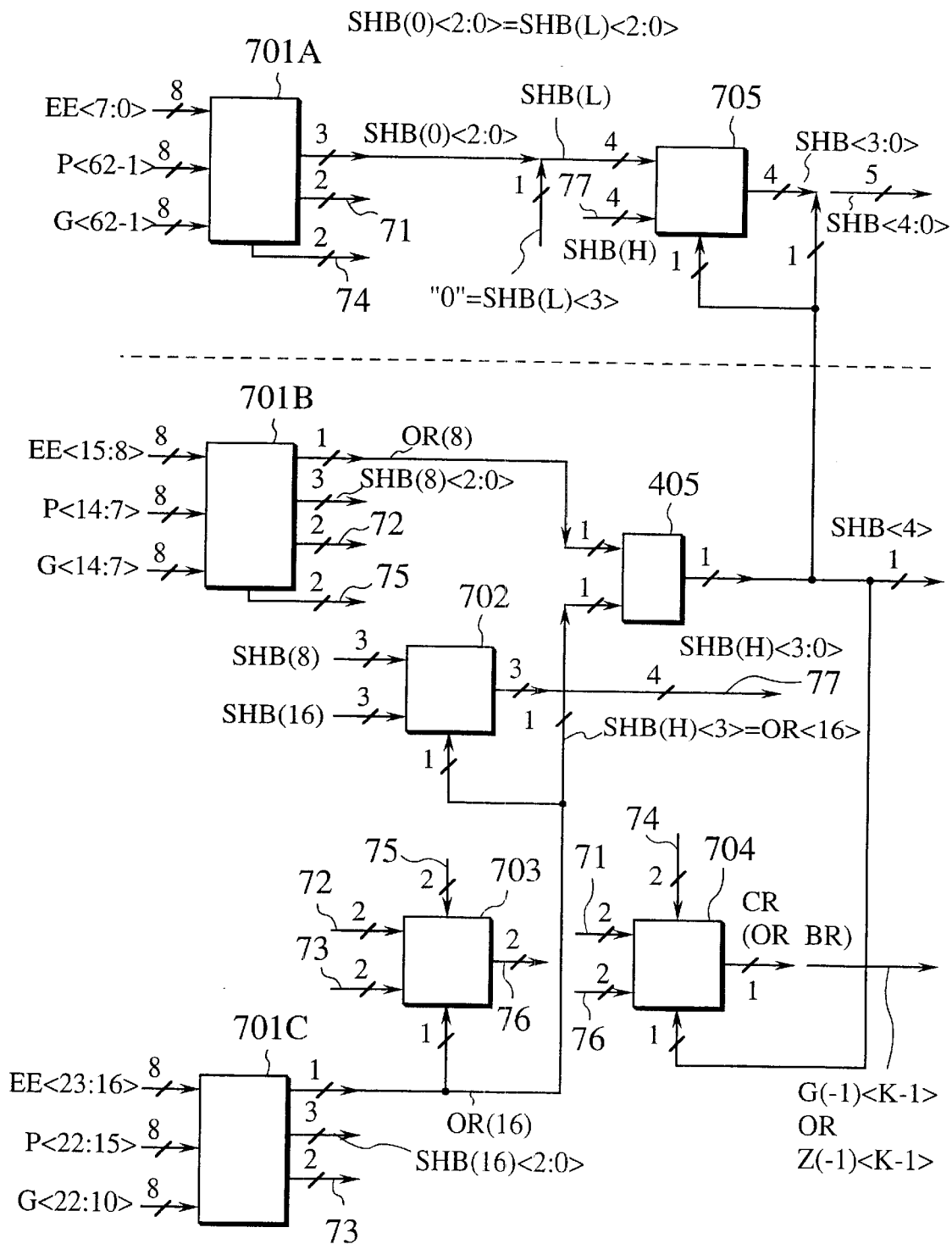
FIG. 12 is a block diagram showing a configuration of a canceling bit position detection circuit for 24 bits and the prediction error detection circuit.

FIG. 12 is a block diagram showing a configuration of the canceling bit position detection circuit for 24 bits and the prediction error detection circuit.

The circuit shown in FIG.12 comprises:

three blocks 701A, 701B, and 701C including the canceling bit position detection circuits (each is a priority encoder) for 8 bits and the prediction error detection circuits;

the two selection circuits 702 and 703;

the carry propagation circuit, the two carry propagation circuits and the selection circuits 404; and the logical sum circuit 405. Where, the selection circuit 702 has the bit width of 4 bits.

The canceling bit position detection circuits for 8 bits are designated by the reference characters 701A, 701B, and 701C from the least significant bit to the most significant bit, respectively.

The canceling bit position detection circuits 701C for 8 bits inputs the signals P<6:−1>, G<6:−1> or Z<6:−1>, and EE<7:0>. The canceling bit position detection circuits 701B for 8 bits inputs the signals P<14:7>, G<14:7> or Z<14:7>, and EE<15:8>. The canceling bit position detection circuits 701A for 8 bits inputs the signals P<22:15>, G<22:15> or Z<22:15>, and EE<23:16>.

The canceling bit position determination circuit calculates the position of a canceling bit based on the position of the most significant bit. Therefore, the canceling bit position determination circuit has the upper block treating the upper 16 bits and the lower block handling the lower 8 bits. That is to say, the canceling bit position determination circuit and the prediction error detection circuit (that are located at the lower section of the dotted line shown in FIG.12) handles the upper 16 bits.

The canceling bit prediction signal of 16 bits is EE<23:8>, the P signal is P<22:7>, and the G signal is G<22:7>.

First, the canceling bit position determination circuit for 8 bits and the prediction error detection circuit 701A as the upper block outputs (see FIG.12) the signals SHB(16)<2:0>, OR(16), P(15)<C−1>, and G(15)<C−1>. Where, 16≦C≦23, the C-th bit of EE(C)="1" becomes the most significant bit.

On the other hand, the canceling bit position determination circuit for 8 bits and the prediction error detection circuit 701B as the intermediate block outputs the signals SHB(8)<2:0>, OR(8), P(7)<B−1>, and G(7)<B−1>. Where, 8≦B≦15, the Bth bit of EE(B)="1" becomes the most significant bit. In addition, the canceling bit position determination circuit for 8 bits and the prediction error detection circuit 701B as the lower block outputs the signals P(7)<15> and G(7)<15> designated by the reference number 75 shown in FIG.12.

The selection circuit 702 inputs the signal OR(16) as the selection control signal and then selects one of the signals SHB(16)<2:0> and SHB (8)<2:0>. When OR(16)="1", the selection circuit 702 selects the signal SHB(16)<2:0> because the upper block inputs the canceling bit prediction signal of "1". Where, the selection circuit 702 outputs the signal SHB(H)<3:0> as the SHB(H)<3>=OR<16>.

On the other hand, when OR(16)="0", the selection circuit 702 selects the signal SHB(8)<2:0>. Where, the selection circuit 702 outputs the signal SHB(H)<3:0> as the SHB(H)<3>=OR<16>.

[Carry Propagation Circuit+Selection Circuit 703]

The carry propagation circuit and selection circuit 703 selects the P and G signals corresponding to the bit specified by the block based on the same manner described above. That is to say, when OR(16)="1", the selection circuit 703 selects the signal P(15)<C−1> and G(15)<C−1> transferred from the upper stream block. Where, in order to reflect the carry propagation from the seventh bit, the following logic is used:

$$P(7)<C-1>=P(15)<C-1> \text{ and } P(7)<14>;$$

and $$G(7)<C-1>=G(15)<C-1> \text{ or } \{P(15)<C-1> \text{ and } G(7)<14>\}.$$

On the other hand, when OR(16)="0", the selection circuit 703 selects the signal P(7)<B−1> and G(7)<B−1> transferred from the upper stream block. In this case, the block 703 outputs these signals because the carry is propagated from the seventh bit. The logical sum circuit 405 performs the logical sum operation between the OR(8) and OR(16) and outputs the signal SHB<4> as the result of the logical sum. This output signal SHB<4> indicates whether or not there is the value k that satisfies the relationship of EE<k>="1" in the upper 16 bits.

Thus, by using the manner described above, the canceling position for the upper 16 bits and the prediction error detection signal are generated.

In the example shown in FIG. 12, the signal from the canceling bit position determination circuit and prediction error detection circuit 701A is output without any changing for the lower 8 bits. Where, because SHB(0)<2:0> is a signal of three bits, it must be expanded by one bit.

The signal SHB<4> becomes the selection control signal for the selection circuit in the block 705. When SHB<4>="1", because at least one bit in the canceling bit prediction signal for the 16 bits in the upper block becomes the value 1, the selection circuit in the block 703 selects SHB(H)<3:0>. On the other hand, when SHB<4>="0", the selection circuit in the block 705 selects SHB(L):<3:0> as SHB<3:0>.

The canceling bit prediction signal is determined by the manner described above and indicates the canceling position by the signal SHB<4:0>. Where, the signal SHB<4:0> represents the inverted value obtained by inverting the actual value for the canceling bit position.

In addition, the canceling error detection signal is selected based on the signal SHB<4>.

The signals P and G corresponding to the bits specified by the block are selected. That is to say, when the signal SHB<4>="1", the signals P(7)<C−1> and G(7)<C−1> from the upper stream block are selected. Where, in order to reflect the carry propagation from the least significant block, the following logic is used:

$$P(-1)<C-1>=(P(7)<C-1>) \text{ and } (P(-1)<6>);$$

and $$G(-1)<C-1>=(G(7)<C-1>) \text{ or } \{(P(7)<C-1>) \text{ and } (G(-1)<6>)\}.$$

On the other hand, when SHB<4>="0", the signals P(−1)<A−1> and G(−1)<A−1> are selected and output without any changing because the carry is propagated from the least significant bit.

When it is assumed that the canceling prediction bit determined finally is "K", the following prediction error detection signal is generated based on the carry signal at this canceling prediction bit:

$$CR<K>=(G(-1)<K-1>) \text{ or } \{(P(-1)<K-1>) \text{ and } (Cin)\}=G(-1)<K-1> \text{ (where, } Cin=0 \text{ when subtraction result is negative);}$$

and $$BR<K>=\text{not } [CR<K>]$$

$$=\text{not } [(G(-1)<K-1>) \text{ or } \{(P(-1)<K-1> \text{ and } (Cin)\}]$$

$$=\text{not } [(G(-1)<K-1>) \text{ or } (P(-1)<K-1>)]$$

$$=Z(-1)<K-1> \text{ (where, } Cin=1 \text{ when the subtraction result is positive).}$$

Although only the signals P and G are explained in the description described above, the signal Z can be also explained because the Z and G have the symmetric characteristic. That is, when the subtraction result is positive, BR<K>=(Z(−1)<K1>) or {(P(−1)<K−1>) and (not (Cin))}= Z(−1)<K−1> (where, Cin=1 when the subtraction result is positive).

That is to say, the two prediction error detection circuits having the same logic are incorporated, and the position of the canceling bit can be specified by switching the input signal to be supplied to the two prediction error detection circuits, under the two assumptions corresponding to positive or negative of the difference of the mantissa parts.

[5] Selectors 64 and 65 (See FIGS. 6 and 7)

The configuration of the floating point execution unit according to the first embodiment has been designed based on the assumption of two cases, the difference of the mantissa parts becomes positive and becomes negative. That is to say, the floating point execution circuit as the first embodiment incorporates the two canceling bit position determination circuits 62A and 62B, and the two prediction error detection circuits 100A and 100B. The mantissa parts Fa and Fb are compared in size in parallel while the position of the canceling bit and the prediction error are calculated. The position of the final canceling bit and the prediction error are determined based on the comparison result of the mantissa parts Fa and Fb. The canceling bit position determination circuits 62A and 62B specify the bit at which the canceling occurs, and the prediction error detection circuits 100A and 100B output the prediction error detection signals simultaneously. During these processing time period, the mantissa parts are compared by the size comparison circuit 7 for mantissa parts that is incorporated in the floating point execution unit separately.

Because the two canceling bit position determination circuits 62A and 62B and the two prediction error detection circuits 100A and 100B are incorporated for the results (positive and negative)of the difference of the mantissa parts, the selectors 64 and 65 select one of the output from the above circuits 62A and 62B and one of the above circuits 100A and 100B based on the comparison result.

(i) When the difference of exponent parts is +1 or when the difference of exponent parts is zero and the difference of mantissa parts is positive (Exa−Exb=+1, or Exa−Exb=0 and Fa>Fb) When the specified bit at which the canceling occurs is <K>, the inverted signal of the carry corresponding to the above specified bit becomes the error prediction signal, BR<K>=Z(−1)<K−1>.

Because the prediction error is included when BR<K>=1, the one bit shift is performed leftward in order to compensate the error. When the difference of the mantissa parts executed by the mantissa size comparison circuit 7 becomes positive and the difference of the exponent parts is +1, the shifted error prediction signal is selected and output.

(ii) When the difference of exponent parts is −1 or when the difference of exponent parts is zero and the difference of mantissa parts is positive (Exa−Exb=−1, or Exa−Exb=0 and Fa<Fb)

On the other hand, when the specified bit at which the canceling occurs is <K>, the carry signal corresponding to the above specified bit becomes the error prediction signal, CR<K>=G(−1)<K−1>.

Because the prediction error is included when CR<K>=1, the one bit shift is performed leftward in order to compensate the error. When the difference of the mantissa parts executed by the mantissa size comparison circuit 7 becomes negative and the difference of the exponent parts is −1, the shifted error prediction signal is selected and output.

Figure 4:
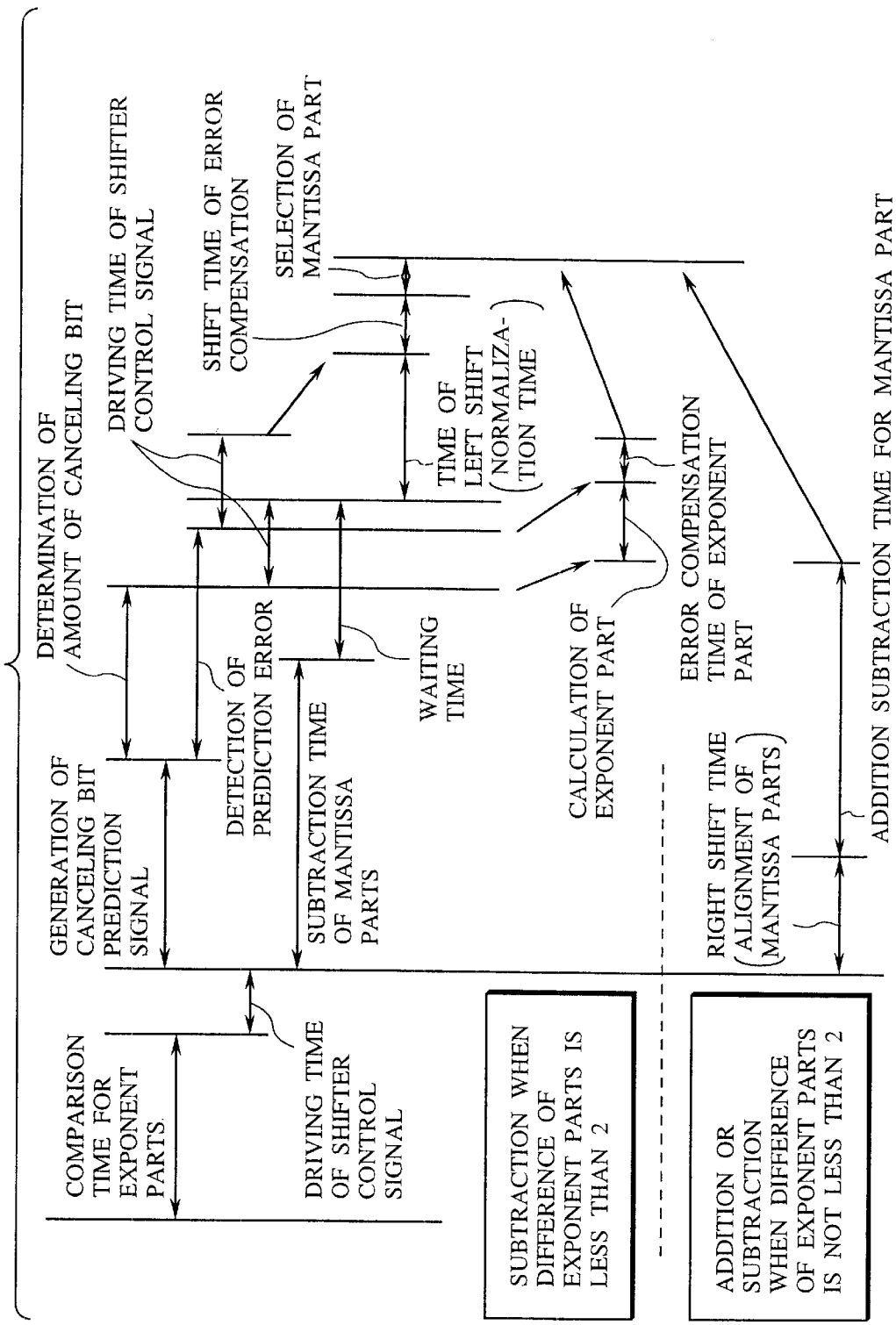
FIG. 4 is a timing chart showing the processing time of the conventional floating point execution unit shown in FIG. 2.
Figure 5:
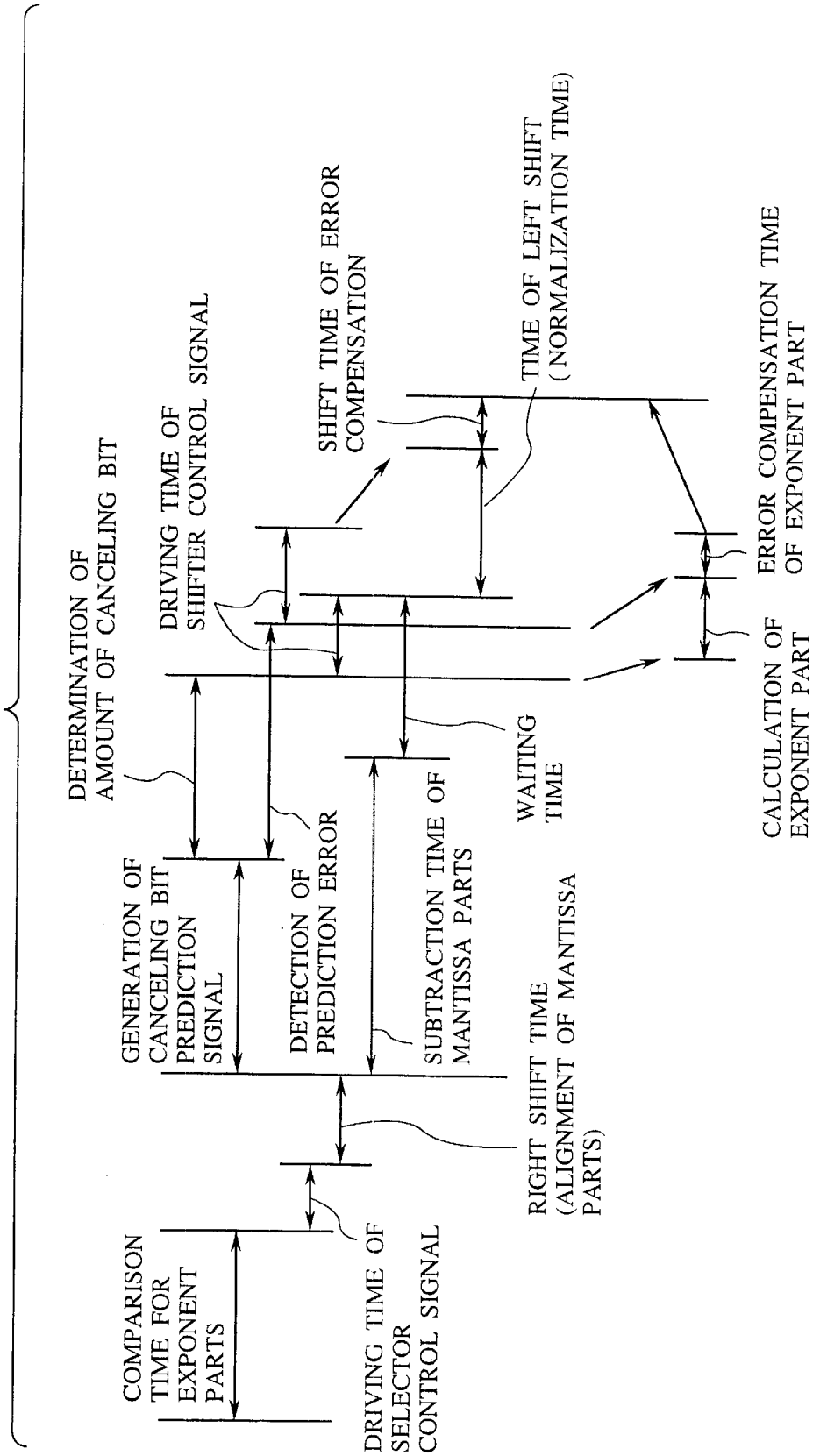
FIG. 5 is a timing chart showing the processing time of the conventional floating point execution unit shown in FIG. 3.
Figure 13:
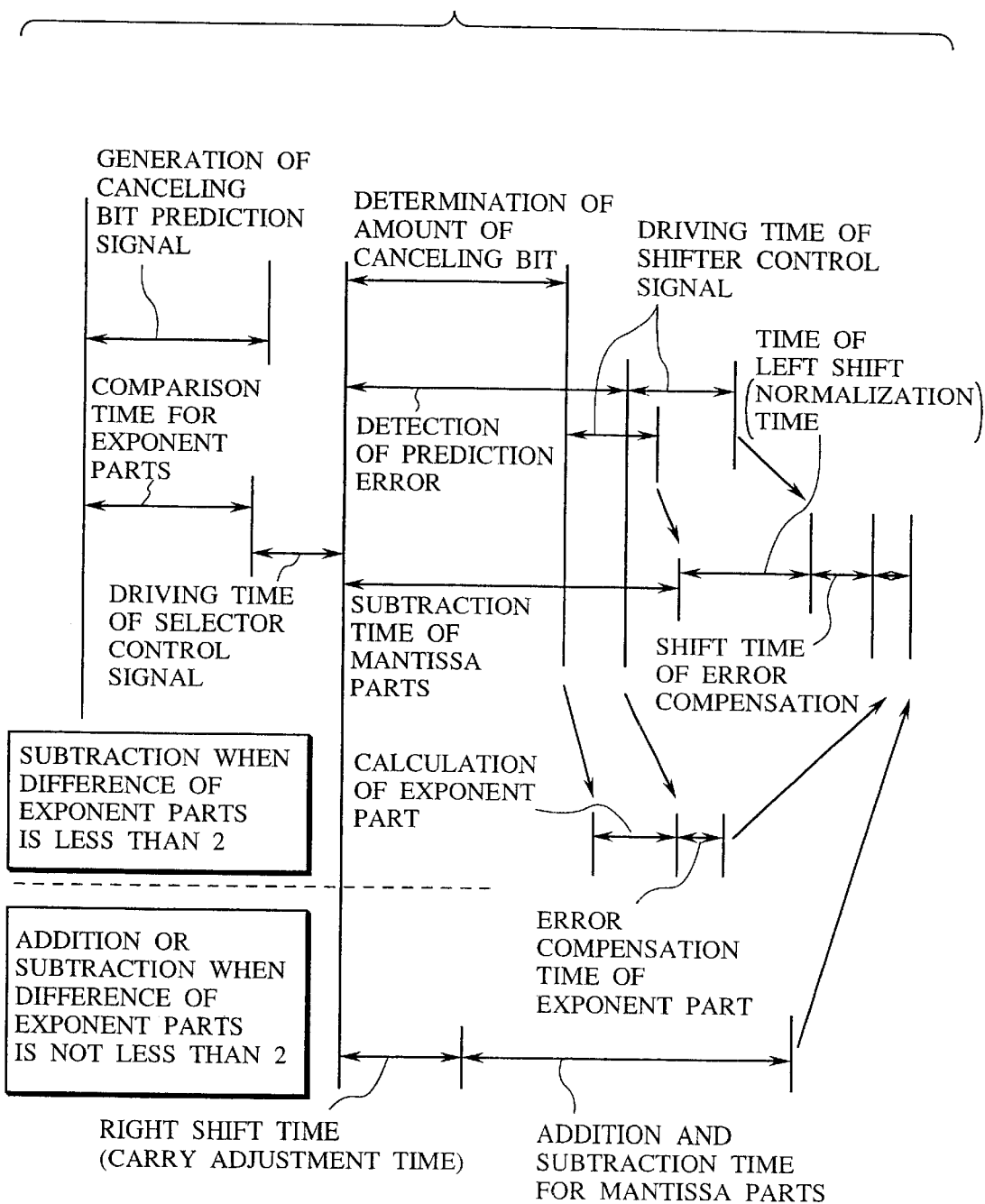
FIG. 13 is a timing chart showing the processing time of the floating point execution unit of the first embodiment shown in FIG. 6.

FIG. 13 is a timing chart showing the processing time of the floating point execution unit of the first embodiment shown in FIG. 6. When the timing chart shown in FIG. 13 is compared with the conventional timing charts shown in FIGS. 4 and 5, it is apparent to improve the following matters:

That is, the waiting time period after the subtraction of the mantissa parts shown in FIG. 5 is not necessary in FIG. 13, because the canceling bit signal generation time and the comparison process for the exponent parts and the selector control signal driving time are within the same time period shown in the left side of in FIG. 13. This advantage causes to reduce the total processing time of the floating point execution unit of the first embodiment.

According to the floating point execution unit of the first embodiment, the two operands before the selectors 2 and 3 input the two operands (that is before the alignment operation) are input directly to the canceling prediction circuit 60 in order to perform the canceling prediction and to determine the canceling bit position. Thereby, it is possible to determine the position of the canceling bit when or before the subtraction unit 5 outputs the subtraction result and to perform the normalization operation for the subtraction result and the compensation process for the normalization error at high speed without any waiting. This causes to increase the total operation time of the floating point execution unit.

Second Embodiment

Figure 14:
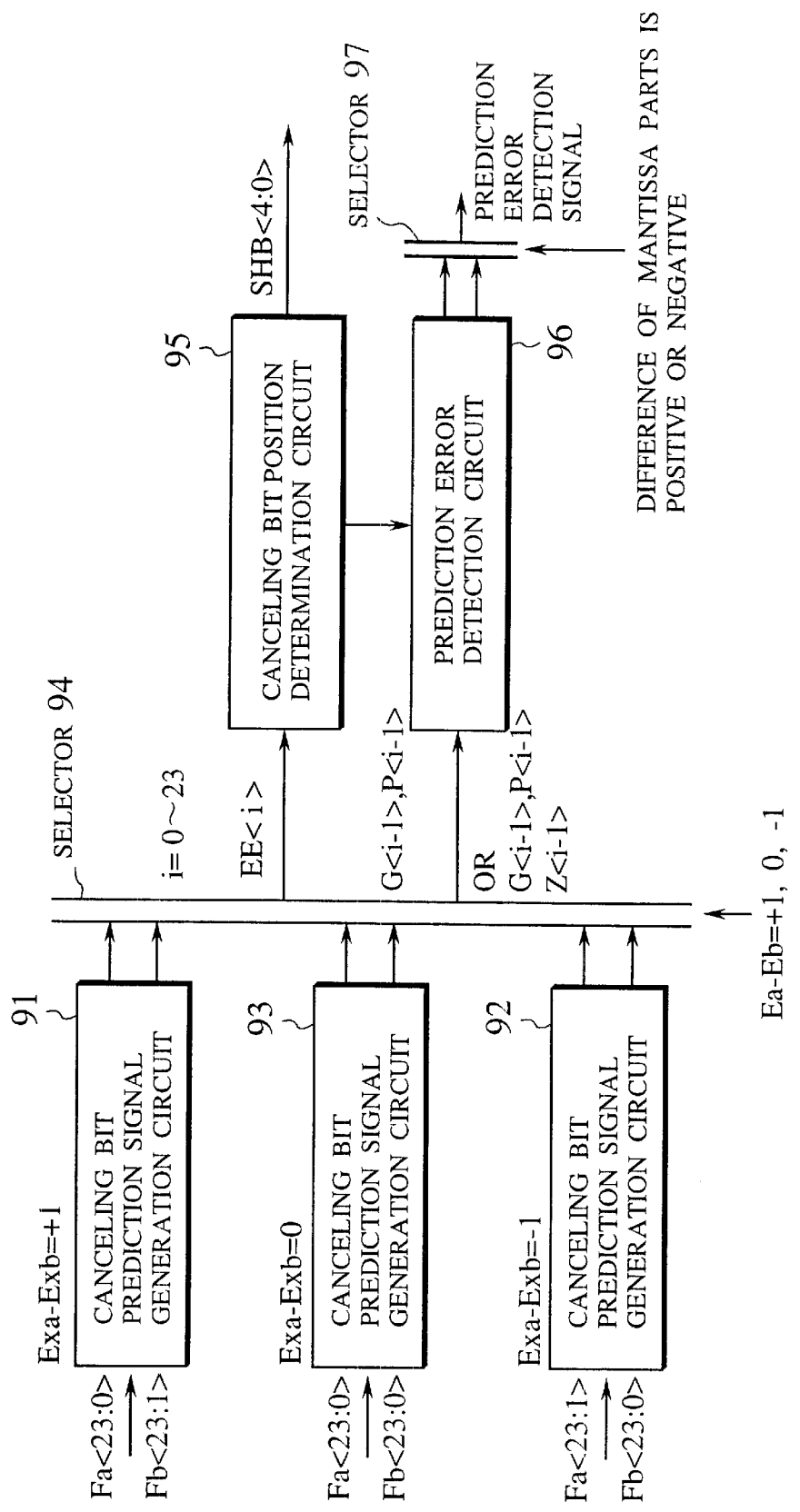
FIG. 14 is a block diagram showing a detailed configuration of a canceling prediction circuit and a prediction error detection circuit in a floating point execution unit as the second embodiment of the present invention.

FIG. 14 is a block diagram showing a detailed configuration of the canceling prediction circuit and the prediction error detection circuit in the floating point execution unit as the second embodiment of the present invention.

The configuration of the canceling prediction circuit and the canceling error detection circuit in the floating point execution unit as the second embodiment is different from the configuration of the first embodiment shown in FIG. 6, and other configuration elements are same in the first and second embodiments. Accordingly, FIG. 14 shows only the configuration of the canceling prediction circuit and the canceling error detection circuit in the floating point execution unit of the second embodiment.

The canceling prediction circuit comprises the three canceling bit prediction signal generation circuits 91, 92, and 93. In particularly, the canceling bit prediction signal generation circuit 93 can always generate an effective canceling bit prediction signal by checking continuous three bits that are adjacent to each other when the difference of the exponent parts in the two operands is zero without comparing the sign of the difference of the mantissa parts in these two operands. Thereby, it is possible to incorporate only the three canceling bit prediction signal generation circuits 91, 92, and 93.

In the configuration of the second embodiment shown in FIG. 14, the selector 94 is incorporated instead of the selector 63 made up of the selectors 63A and 63B in the first embodiment shown in FIGS. 6 and 7, and the selector 97 is incorporated instead of the selector 65 shown in FIGS. 6 and 7. In addition, the selector 64 shown in FIGS. 6 and 7 is omitted from the configuration of the floating point execution unit as the second embodiment. The selector 94 selects one of the canceling bit prediction signals generated by the canceling bit prediction signal generation circuits 91, 92, and 93 according to the difference of the exponent parts in the two operands. After this selection, the canceling bit position determination circuit 95 determines the position of the canceling bit. This determination of the position controls the shift amount of the left shifter 8 (shown in FIG. 6).

The prediction error detection circuit 96 detects whether or not the canceling bit prediction includes an error based on the selection information from the selector 94 and the position of the canceling bit from the canceling bit position determination circuit 95. Because the detection result is different according to the sign of the difference of the mantissa parts in the two operands, the selector 97 selects the detection result and then outputs the selected one to the error compensation shifter 9 (shown in FIG. 6).

Because the generation logic of the canceling bit prediction signal of the second embodiment when Exa−Exb=0 is different from that of the first embodiment, the second embodiment can incorporate only the three canceling bit prediction signal generation circuits and only the one canceling bit position determination circuit. That is to say, the canceling prediction circuit and the canceling prediction detection circuit of the second embodiment comprises: the two canceling bit prediction signal generation circuits 91 and 92; the one canceling bit prediction signal generation circuit 93; the selector 94; the one canceling bit position determination circuit 95; the prediction error detection circuit 96; and the selector 97.

That is to say, in the second embodiment shown in FIG. 14, the two canceling bit prediction signal generation circuits 61B and 61D in the first embodiment shown in FIG. 7 are replaced with one canceling bit prediction signal generation circuit 93. Other configuration elements of the second embodiment are the same as those of the first embodiment shown in FIG. 6.

The logic in the second embodiment is as follows:

(I) When the difference of exponent parts is +1 (Exa−Exb=1)

Because it is necessary to shift the mantissa part Fb rightward by one bit while arithmetic operation, the following signals are defined:

$i<23$ $G<i> = (Fa<i>)$ and $(FbX<i+1>)$;

$P<i> = (Fa<i>)$ xor $(FbX<i+1>)$;

and $Z<i> = (FaX<i>)$ and $(Fb<i+1>)$.

In addition, $G<23>=1$, $Z<23>=P<23>=0$, $Z<-1>=Fb<0>$, $G<-1>=0$, and $P<-1>=FbX<0>$.

Because the subtraction result is always positive, the canceling bit prediction signal $EE<i>$ becomes as follows:

$EE<i> = (PX<i>)$ and $(ZX<i-1>)$ (the Logic $EE<i>=LZ<i>$ is defined).

This result corresponds to the generation logic of the canceling bit prediction signal generation circuits 91.

(II) When the: difference of exponent parts is zero (Exa−Exb=0)

The canceling bit prediction signal generation circuit 93 checks the state of P, G, and Z signal of continuous three bits, and thereby generates the canceling bit prediction signal.

$i<23$ $G<i>=(Fa<i>)$ and $(FbX<i>)$;

$P<i>=(Fa<i>)$ xor $(FbX<i>)$;

and $Z<i>=(FaX<i>)$ and $(Fb<i>)$.

In addition, $P<23>=1$, $G<23>=Z<23>=0$, $Z<-1>=0$, $G<-1>=0$, and $P<-1>=1$.

The canceling bit prediction signal EE<i> becomes $EE<i>=LQ<i>=[P<i+1$ and $\{(Z<i>$ and $GX<i-1>)$ or $(G<i>$ and $ZX<i-1>)\}]$ or $[PX<i+1$ and $\{(Z<i>$ and $ZX<i-1>)$ or $(G<i>$ and $GX<i-1>)\}]$.

This result corresponds to the logic of the canceling bit prediction signal generation circuit 93.

(III) When the difference of exponent parts is −1 (Exa−Exb=−1)

Because it is necessary to shift the mantissa part Fa rightward by one bit, the following signals are defined:

$i<23$ $G<i>=(FbX<i>)$ and $(Fa<i+1>)$;

$P<i>=(FbX<i>)$ xor $(Fa<i+1>)$;

and $Z<i>=(Fb<i>)$ and $(FaX<i+1>)$.

In addition, $Z<23>=1$, $G<23>=P<23>=0$, $G<-1>=Fa<0>$, $Z<-1>=0$, and $P<-1>=FaX<0>$.

Because the subtraction result is always negative, the canceling bit prediction signal EE<i> becomes as follows:

$EE<i>=(PX<i>)$ and $(GX<i-1>)$ (the Logic $EE<i>=LG<i>$ is defined).

In the case (II) described above, it is possible to generate the canceling bit prediction signal without comparing the difference of the mantissa parts by checking the state of the P, G, and Z signals the continuous three bits.

The reason why the configuration shown in FIG. 14 incorporates only one canceling bit position determination circuit 95 and one prediction error detection circuit 96 is that the second embodiment of the present invention can generate the canceling bit prediction signal even if the difference of the mantissa parts in two operands is not checked. In addition, in the second embodiment, the selector 64 shown in FIG. 6 is not necessary because the configuration shown in FIG. 14 incorporates only one canceling bit position determination circuit 95 that is identical 62A and 62B.

On the other hand, the prediction error detection signal depends on the sign of the difference of the mantissa parts. This means that the generation process is switched based on the sign of the difference of the mantissa parts, as has been explained in the first embodiment of the present invention.

The canceling bit position determination circuit 95 inputs the selection result of the selector 94 whose operation is executed based on the difference of the exponent parts. That is to say, there are three states "+1", "0", and "−1" in the difference of the exponent parts. The selector 94 selects one of the canceling bit prediction signals EE<i>, P<i−1>, and G<i−1>(or both G<i−1>and Z<i−1>) output from the two canceling bit prediction signal generation circuits 91 and 92 and the canceling bit prediction signal generation circuit 93 according to the selection signals corresponding to the above three states "+1", "0", and "−1".

The canceling bit position determination circuit 95 determines the canceling bit amount SHB<4:0>. As different from the first embodiment, it is possible to predict the position of the canceling bit within one bit error without any assuming the sign of the difference of the mantissa parts in two operands.

The selector 97 selects one of the prediction error detection signals CR<X> and BR<K> output from the prediction error detection circuit 96 based on the sign of the difference of the mantissa parts.

In the same manner as the first embodiment, it is possible to generate the selection control signal for the selector 97 by using the logical sum of the signals indicating the two states "+1" and "−1" of the difference of the exponent parts. The logical sum is as follows:

Selection of BR<K>: (Difference of mantissa parts is positive) or (Difference of exponent parts is "+1"); and Selection of CR<K>: (Difference of mantissa parts is negative) or (Difference of exponent parts is "−1").

The effect of the second embodiment of the present invention is basically the same as that of the first embodiment shown in FIG. 13.

That is to say, in the first embodiment shown in FIG. 13, "the canceling bit signal generation" and "the comparison+ selector control signal driving" are executed in parallel. Therefore it is possible to begin "the determination operation of the canceling bit amount" and "the subtraction operation for the mantissa parts" simultaneously. Thereby the second embodiment has no waiting time after the subtraction operation of the mantissa parts. This causes to reduce the total operation time of the floating point execution unit of the second embodiment like the first embodiment of the present invention. On the contrary, the conventional example shown in FIG. 5 must require this waiting time caused after the subtraction operation of the mantissa parts.

The number of logic circuit's stages in the canceling bit prediction signal generation circuit 93 is increased when compared with the number of logic circuit's stages in each of the canceling bit prediction signal generation circuits 91 and 92. This causes to increase the hardware size and operation time for the canceling bit prediction signal generation circuit 93. However, it is possible to neglect the increasing of the operation time in the canceling bit prediction signal generation circuit 93, because the operation time of the canceling bit prediction signal generation circuit 93 is shorter than that of the comparison time for the exponent parts and the delay time in buffers (omitted from drawings) for driving the selector selection control signal for the selectors (as critical).

In the second embodiment, the operation time to determine the signal SHB<4:0> can be shorter than that of the first embodiment because the selectors at the final stage (in FIG. 6) are removed.

In the floating point execution unit according to the second embodiment of the present invention, it is possible to incorporate only the three canceling bit prediction signal generation circuits 91, 92, and 93 in which the canceling bit prediction signal generation circuit 93 generates the effective prediction signal without any assuming sign of the difference of the mantissa parts by checking continuous three bits when the difference of the exponent parts in the two operands is zero. The above configuration causes to decrease the number of the canceling bit position determination circuits and the number of the prediction error detection circuits to one, respectively. In addition the number of the selectors is thereby decreased. Therefore the floating point execution unit of the second embodiment can execute the arithmetic operation at higher speed than that of the first embodiment and can decrease the hardware size.

As set forth in detail, according to the floating point execution unit of the present invention, it is possible to begin the comparison operation for the exponent parts of operands and the canceling bit prediction operation simultaneously, and to execute the arithmetic operation at high speed.

While the above provides a full and complete disclosure of the preferred embodiments of the present invention, various modifications, alternate constructions and equivalents may be employed without departing from the true spirit and scope of the invention. Therefore the above description and illustration should not be construed as limiting the scope of the invention, which is defined by the appended claims.

What is claimed is:

1. A floating point execution unit in which a subtraction circuit executes a subtraction operation only when a difference of exponent parts in two operands as floating point numbers is 1, 0, and −1, the floating point execution unit comprising:

a first selection circuit for an alignment of said mantissa parts in said two operands by selecting one of cases where one of said mantissa parts in said two operands is shifted by one bit and no mantissa parts are shifted, by comparing exponent parts in said two operands;

a subtraction circuit for executing a subtraction of said mantissa parts in said two operands after said alignment;

a second selection circuit for selecting one of said subtraction result and an inverted value that is obtained by inverting said subtraction result;

a left shifter circuit for executing normalization operation for said selected one output from said second selection circuit;

an error compensation circuit for compensating a canceling prediction error in said subtraction result after said normalization operation;

a canceling prediction circuit for generating a canceling bit prediction signal of said subtraction result based on said mantissa parts of said two operands before said alignment executed by said first selection circuit, and then for determining a position of said canceling bit; and a prediction error detection circuit for generating a compensation signal to compensate a prediction error indicated by said canceling bit prediction signal from said canceling prediction circuit, wherein said left shifter circuit executes said normalization operation for said subtraction result by shifting it leftward from said position of said canceling bit generated by said canceling prediction circuit, and said error compensation circuit compensates said canceling prediction error for said subtraction result that has been normalized based on said compensation signal output from said prediction error detection circuit, and wherein said canceling prediction circuit comprises:

a first canceling bit prediction signal generation circuit for generating said canceling bit prediction signal for said subtraction result when said difference of said exponent parts in said two operands is 1;

a second canceling bit prediction signal generation circuit for generating said canceling bit prediction signal for said subtraction result when said difference of said exponent parts in said two operands is −1;

a third canceling bit prediction signal generation circuit for generating said canceling bit prediction signal for said subtraction result when said difference of said exponent parts in said two operands is 0 and said difference of said mantissa parts in said two operands is assumed as positive;

a fourth canceling bit prediction signal generation circuit for generating said canceling bit prediction signal for said subtraction result when said difference of said exponent parts in said two operands is 0 and said difference of said mantissa parts in said two operands is assumed as negative;

a first selection circuit for selecting one of said canceling bit prediction signals generated by said first canceling bit prediction signal generation circuit and said third canceling bit prediction signal generation circuit when said difference of said exponent parts in said two operands is 1 or 0, a second selection circuit for selecting one of said canceling bit prediction signals generated by said second canceling bit prediction signal generation circuit and said fourth canceling bit prediction signal generation circuit when said difference of said exponent parts in said two operands is −1 or 0, a first canceling bit position determination circuit for determining a position of said canceling bit based on said canceling bit prediction signal selected by said first selection circuit;

a second canceling bit position determination circuit for determining a position of said canceling bit based on said canceling bit prediction signal selected by said second selection circuit; and a third selection circuit for selecting one of said positions of said canceling bits determined by said first canceling bit position determination circuit and said second canceling bit position determination circuit based on a sign of said difference of said mantissa parts in said two operands.

2. A floating point execution unit in which a subtraction circuit executes a subtraction operation only when a difference of exponent parts in two operands as floating point numbers is 1, 0, and −1, the floating point execution unit comprising:

a first selection circuit for an alignment of said mantissa parts in said two operands by selecting one of cases where one of said mantissa parts in said two operands is shifted by one bit and no mantissa parts are shifted, by comparing exponent parts in said two operands;

a subtraction circuit for executing a subtraction of said mantissa parts in said two operands after said alignment;

a second selection circuit for selecting one of said subtraction result and an inverted value that is obtained by inverting said subtraction result;

a left shifter circuit for executing normalization operation for said selected one output from said second selection circuit;

an error compensation circuit for compensating a canceling prediction error in said subtraction result after said normalization operation;

a canceling prediction circuit for generating a canceling bit prediction signal of said subtraction result based on said mantissa parts of said two operands before said alignment executed by said first selection circuit, and then for determining a position of said canceling bit; and a prediction error detection circuit for generating a compensation signal to compensate a prediction error indicated by said canceling bit prediction signal from said canceling prediction circuit, wherein said left shifter circuit executes said normalization operation for said subtraction result by shifting it leftward from said position of said canceling bit generated by said canceling prediction circuit, and said error compensation circuit compensates said canceling prediction error for said subtraction result that has been normalized based on said compensation signal output from said prediction error detection circuit, and wherein said canceling prediction circuit comprises:
- a first canceling bit prediction signal generation circuit for generating said canceling bit prediction signal for said subtraction result when said difference of said exponent parts in said two operands is 1;
- a second canceling bit prediction signal generation circuit for generating said canceling bit prediction signal for said subtraction result when said difference of said exponent parts in said two operands is −1;
- a third canceling bit prediction signal generation circuit for generating said canceling bit prediction signal for said subtraction result when said difference of said exponent parts in said two operands is 0;
- a first selection circuit for selecting one of said canceling bit prediction signals generated by said first canceling bit prediction signal generation circuit, said second canceling bit prediction signal generation circuit, and said third canceling bit prediction signal generation circuit according to said values 1, −1, and 0 of said difference of said exponent parts in said two operands; and
- a canceling bit position determination circuit for determining a position of said canceling bit based on said canceling bit prediction signal selected by said first selection circuit.

3. A floating point execution unit for switching operation procedures according to absolute values (that are not less than 2 and less than 2) of a difference of exponent parts in two operands as floating point numbers, comprising:

an addition subtraction unit for performing an addition and for performing a subtraction when said absolute value of said difference of said exponent parts in said two operands is not less than 2;

a subtraction unit for performing only a subtraction when said absolute value of said difference of said exponent parts in said two operands is less then 2;

an exponent part comparison unit for calculating said difference of said exponent parts in said two operands;

a right shifter for performing an alignment of said mantissa parts in said two operands;

a size comparison unit for comparing a size of said mantissa parts of said two operands;

a canceling prediction circuit comprising:
- a canceling bit prediction signal generation circuit for predicting an amount of canceling occurred in subtraction result of said subtraction unit within an error of one bit, and then for generating a canceling bit prediction signal indicating a position of said canceling bit; and
- a canceling bit position determination circuit for converting said canceling bit prediction signal to a binary number and for outputting it as a canceling prediction signal, a canceling error detection circuit for detecting an error of said canceling prediction signal;

a left shifter for performing a normalization operation for said subtraction result from said subtraction unit by shifting said subtraction result leftward; and an error compensation shifter for compensating said error of said subtraction result based on said detection result detected by said prediction error detection circuit, wherein said subtraction unit performs a subtraction operation between said mantissa parts of said two operands, or between one mantissa part and a shifted value obtained by shifting another mantissa part rightward in said two operands based on said difference of said exponent parts from said exponent comparison unit, and then outputs a subtraction result, said canceling prediction circuit inputs directly said mantissa parts of said two operands and also inputs said difference of said exponent parts from said exponent comparison unit, and outputs said canceling prediction amount, caused by said subtraction operation by said subtraction unit, to said left shifter, said prediction error detection circuit inputs directly said mantissa parts in said two operands, inputs said difference of said exponent parts from said exponent comparison unit, inputs said canceling prediction signal from said canceling prediction circuit, and inputs a comparison result of said mantissa parts output from said size comparison unit, and then outputs an error detection signal indicating a presence of said prediction error output from said canceling prediction circuit, said left shifter performs said normalization operation by shifting leftward said subtraction result output from said subtraction unit based on a canceling prediction amount indicated by said canceling prediction signal output from said canceling prediction circuit, and said error compensation shifter compensates an error of said subtraction result normalized by said left shifter based on said error detection signal output from said prediction error detection circuit, wherein in said canceling prediction circuit for predicting said canceling amount included in said subtraction result obtained by said subtraction unit within an error of one bit, said canceling bit prediction signal generation circuit generates said canceling bit prediction signal EE in the following cases (I), (IIa), (IIb), and (III) based on said difference of said exponent parts (Exa−Exb) in said two operands, where, said mantissa parts in said two operands "a" and "b" are Fa<n:0> and Fb<n:0>, each having An +1" bit width, said exponent parts are Exa and Exb, a logical product is "and", a logical sum is "or", an exclusive logical sum is "xor", and a logical not is "not", and (I) when Exa−Exb=1, said canceling bit prediction signal EE to indicate said predicted position of said canceling bit caused in subtraction result between continuous two bits in said two operands is predicted by following logic:

$EE<i> = (\text{not } (P<i>)) \text{ and } (\text{not } (Z<i-1>))$, wherein, when an integer i is i<n, $G<i> = (Fa<i>) \text{ and } (\text{not } (Fb<i+1>))$ $P<i> = (Fa<i>) \text{ xor } (\text{not } (Fb<i+1>))$ $Z<i> = (\text{not } Fa<i>)) \text{ and } (\text{not } (Fb<i+1>))$, and $$G<n>=1, Z<n>=P<n>=0, Z<-1>=Fb<0>, G<-1>=0, \text{ and } P<-1>= \text{not } (Fb<0>);$$

(IIa) under the assumption of Exa−Exb=0 and Fa−Fb>0, said canceling bit prediction signal EE to indicate said predicted position of said canceling bit caused in subtraction result between continuous two bits in said two operands is predicted by following logic:

$$EE<i>=(\text{not } (P<i>)) \text{ and } (\text{not } (Z<i-1>)),$$

wherein, when an integer i is i<n, $$G<i>=(Fa<i>) \text{ and } (\text{not } (Fb<i>))$$

$$P<i>=(Fa<i>) \text{ xor } (\text{not } (Fb<i>)),$$

$$Z<i>(\text{not } Fa<i>)) \text{ and } (\text{not } (Fb<i>)),$$

and $$P<n>=1, G<n>=Z<n>=0, Z<-1>=0, G<-1>=0, \text{ and } P<-1>=1;$$

(IIb) Under assumption of Exa−Exb=0 and Fa−Fb<0, said canceling bit prediction signal EE to indicate said predicted position of said canceling bit caused in subtraction result between continuous two bits in said two operands is predicted by following logic:

$$EE<i>=(\text{not } (P<i>)) \text{ and } (\text{not } (G<i-1>)),$$

wherein, when an integer i is i<n, $$G<i>=(Fa<i>) \text{ and } (\text{not } (Fb<i>)),$$

$$P<i>=(Fa<i>) \text{ xor } (\text{not } (Fb<i>)),$$

$$Z<i>=(\text{not } Fa<i>)) \text{ and } (\text{not } (Fb<i>)),$$

and $$P<n>=1, G<n>=Z<n>=0, Z<-1>=0, G<-1>=0, \text{ and } P<-1>=1;$$

(III) when Exa−Exb=1, said canceling bit prediction signal EE to indicate said predicted position of said canceling bit caused in subtraction result between continuous two bits in said two operands is predicted by following logic:

$$EE<i>=(\text{not } (P<i>)) \text{ and } (\text{not } (G<i-1>)),$$

wherein, when an integer i is i<n, $$G<i>=(\text{not } Fb<i>) \text{ and } (\text{not } (Fa<i+1>)),$$

$$P<i>=(\text{not } Fb<i>) \text{ xor } (\text{not } (Fa<i+1>)),$$

$$Z<i>=Fb<i> \text{ and } (\text{not } (Fa<i+1>)),$$

and $$Z<n>=1, G<n>=P<n>=0, G<-1>=Fa<0>, Z<-1>=0, \text{ and } P<-1>= \text{not } (Fa<0>),$$

wherein, the number of said canceling bit position determination circuit is two for two cases in which said difference of said mantissa parts is positive or assumed as positive, and said difference of said mantissa parts is negative or assumed as negative, and said canceling bit position determination circuit outputs said canceling bit position in binary number expression which is a most significant bit "i" in said EE<i>="1", and selects one of said canceling bit positions in said two cases based on said value (Fa−Fb) output from said size comparison circuit, with said canceling bit position determination circuit, said canceling prediction error detection circuit determines the values G(−1)<k−1> and Z(−1)<k−1>, where, $$P(k)<k>=P<k>,$$

$$G(k)<k>=G<k>,$$

$$Z(k)<k>=P<k>,$$

$$P(k)<k+1>=(P(k+1)<k+1>) \text{ and } (P(k)<k>,$$

$$G(k)<k+1>=(G(k+1)<k+1>) \text{ and } \{(P(k+1)<k+1>) \text{ and } (G(k)<k>)\},$$

$$Z(k)<k+1>=(Z(k+1)<k+1>) \text{ or } \{(P(k+1)<k+1>) \text{ and } (Z(k)<k>)\},$$

and $$P(m)<k>=(P(n)<k>) \text{ and } \{(P(m)<n-1>) \ (m<n<k),$$

$$G(m)<k>=G(n)<k> \text{ or } \{(P(n)<k>) \text{ and } (G(m)<n-1>)\}(m<n<k, \text{ and}$$

said canceling prediction error detection circuit selects said G(−1)<k−1> when (Fa−Fb)<0 that is output from said size comparison circuit, and said Z(−1)<k−1>when (Fa−Fb)>0 that is output from said size comparison circuit.

4. A floating point execution unit for switching operation procedures according to absolute values (that are not less than 2 and less than 2) of a difference of exponent parts in two operands as floating point numbers, comprising:

an addition subtraction unit for performing an addition and for performing a subtraction when said absolute value of said difference of said exponent parts in said two operands is not less than 2;

a subtraction unit for performing only a subtraction when said absolute value of said difference of said exponent parts in said two operands is less then 2;

an exponent part comparison unit for calculating said difference of said exponent parts in said two operands;

a right shifter for performing an alignment of said mantissa parts in said two operands;

a size comparison unit for comparing a size of said mantissa parts of said two operands;

a canceling prediction circuit comprising:
  a canceling bit prediction signal generation circuit for predicting an amount of canceling occurred in subtraction result of said subtraction unit within an error of one bit, and then for generating a canceling bit prediction signal indicating a position of said canceling bit; and
  a canceling bit position determination circuit for converting said canceling bit prediction signal to a binary number and for outputting it as a canceling prediction signal, a canceling error detection circuit for detecting an error of said canceling prediction signal;

a left shifter for performing a normalization operation for said subtraction result from said subtraction unit by shifting said subtraction result leftward; and an error compensation shifter for compensating said error of said subtraction result based on said detection result detected by said prediction error detection circuit, wherein said subtraction unit performs a subtraction operation between said mantissa parts of said two operands, or between one mantissa part and a shifted value obtained by shifting another mantissa part rightward in said two operands based on said difference of said exponent parts from said exponent comparison unit, and then outputs a subtraction result, said canceling prediction circuit inputs directly said mantissa parts of said two operands and also inputs said difference of said exponent parts from said exponent comparison unit, and outputs said canceling prediction amount, caused by said subtraction operation by said subtraction unit, to said left shifter, said prediction error detection circuit inputs directly said mantissa parts in said two operands, inputs said difference of said exponent parts from said exponent comparison unit, inputs said canceling prediction signal from said canceling prediction circuit, and inputs a comparison result of said mantissa parts output from said size comparison unit, and then outputs an error detection signal indicating a presence of said prediction error output from said canceling prediction circuit, said left shifter performs said normalization operation by shifting leftward said subtraction result output from said subtraction unit based on a canceling prediction amount indicated by said canceling prediction signal output from said canceling prediction circuit, and said error compensation shifter compensates an error of said subtraction result normalized by said left shifter based on said error detection signal output from said prediction error detection circuit, wherein in said canceling prediction circuit for predicting said canceling amount included in said subtraction result obtained by said subtraction unit within an error of one bit, said canceling bit prediction signal generation circuit generates said canceling bit prediction signal EE in the following cases (I), (IIa), (IIb), and (III) based on said difference of said exponent parts (Exa−Exb) in said two operands, where, said mantissa parts in said two operands "a" and "b" are Fa<n:0> and Fb<n:0>, each having An+1" bit width, said exponent parts are Exa and Exb, a logical product is "and", a logical sum is "or", an exclusive logical sum is "xor", and a logical not "not", and (I) when Exa−Exb=1, said canceling bit prediction signal EE to indicate said predicted position of said canceling bit caused in subtraction result between continuous two bits in said two operands is predicted by following logic:

$EE<i> = (\text{not } (P<i>)) \text{ and } (\text{not } (Z<i-1>))$, wherein, when an integer i is i<n, $G<i> = (Fa<i>) \text{ and } (\text{not } (Fb<i+1>))$, $P<i> = (Fa<i>) \text{ xor } (\text{not } (Fb<i+1>))$, $Z<i> = (\text{not } (Fa<i>)) \text{ and } (Fb<i+1>)$, and $G<n>=1, Z<n>=P<n>=0, Z<-1>=Fb<0>, G<-1>=0, \text{ and } P<-1>=\text{not } (Fb<0>)$;

(IIa) under the assumption of Exa−Exb=0 and Fa−Fb>0, said canceling bit prediction signal EE to indicated said predicted position of said canceling bit caused in subtraction result between continuous two bits in said two operands is predicted by following logic:

$EE<i> = (\text{not } (P<i>)) \text{ and } (\text{not } (Z<i-1>))$, wherein, when an integer i is i<n, $G<i> = (Fa<i>) \text{ and } (\text{not } (Fb<i>))$, $P<i> = (Fa<i>) \text{ xor } (\text{not } (Fb<i>))$, $Z<i> = (\text{not } (Fa<i>)) \text{ and } (Fb(i>)$, and $P<n>=1, G<n>=Z<n>=0, Z<-1>=0, G<-1>=0, \text{ and } P<-1>=1$;

(IIb) Under assumption of Exa−Exb=0 and Fa−Fb<0, said canceling bit prediction signal EE to indicate said predicted position of said canceling bit caused in subtraction result between continuous two bits in said two operands is predicted by following logic:

$EE<i> = (\text{not } (P<i>)) \text{ and } (\text{not } (G<i-1>))$, wherein, when an integer i is i<n, $G<i> = (Fa<i>) \text{ and } (\text{not } (Fb<i>))$, $P<i> = (Fa<i>) \text{ xor } (\text{not } (Fb<i>))$, $Z<i> = (\text{not } Fa<i>)) \text{ and } (\text{not } (Fb<i>))$, and $P<n>=1, G<n>=Z<n>=0, Z<-1>=0, G<-1>=0, \text{ and } P<-1>=1$;

(III) when Exa−Exb=−1, said canceling bit prediction signal EE to indicate said predicted position of said canceling bit caused in subtraction result between continuous two bits in said two operands is predicted by following logic:

$EE<i> = (\text{not } (P<i>)) \text{ and } (\text{not } (G<i-1>))$, wherein, when an integer i is i<n, $G<i> = (\text{not } Fb<i>) \text{ and } (Fa<i+1>))$, $P<i> = (\text{not } Fb<i>) \text{ xor } (Fa<i+1>))$, $Z<i> = Fb<i> \text{ and } (\text{not } (Fa<i+1>))$, and $Z<n>=1, G<n>=P<n>=0, G<-1>=Fa<0>, Z<-1>=0, \text{ and } P<-1>=\text{not } (Fa<0>)$, wherein, the number of said canceling bit position determination circuit is two for two cases in which said difference of said mantissa parts is positive or assumed as positive, and said difference of said mantissa parts is negative or assumed as negative, and said canceling bit position determination circuit outputs said canceling bit position in binary number expression which is a most significant bit "i" in said EE<i>="1", and selects one of said canceling bit positions in said two cases based on said value (Fa−Fb) output from said size comparison circuit, with said canceling bit position determination circuit, said canceling prediction error detection circuit determines the values G(−1)<k−1> and Z(−1)<k−1>, where, $P(k)<k> = P<k>$, $G(k)<k> = G<k>$ $Z(k)<k>=Z<k>,$ $P(k)<k+1>=(P(k+1)<k+1>)$ and $(P(k)<k>),$ $G(k)<k+1>=(G(k+1)<k+1>)$ and $\{(P(k+1)<k+1>)$ and $(G(k)<k>)\},$ $Z(k)<k+1>=(Z(k+1)<k+1>)$ or $\{(P(k+1)<k+1))$ and $(Z(k)<k>)\},$ and $P(m)<k>=P(n)<k>)$ and $\{(P(m)<n-1>)$ $(m<n<k),$ $G(m)<k>=G(n)<k>$ or $\{(P(n)<k>)$ and $(G(m)<n-1>)\}(m<n<k)$ $Z(m)<k>=Z(n)<k>$ or $\{(P(n)<k>)$ and $(Z(m)<n-1>)\}(m<n <k),$ and said canceling prediction error detection circuit selects said $G(-1)<k-1>$ when $(Fa-Fb)<0$ that is output from said size comparison circuit, and $Z(-1)<k-1>$ when $(Fa-Fb)>0$ that is output from said size comparison circuit.

5. A floating point execution unit for switching operation procedures according to absolute values (that are not less than 2 and less than 2) of a difference of exponent parts in two operands as floating point numbers, comprising:

an addition subtraction unit for performing an addition and for performing a subtraction when said absolute value of said difference of said exponent parts in said two operands is not less than 2;

a subtraction unit for performing only a subtraction when said absolute value of said difference of said exponent parts in said two operands is less then 2;

an exponent part comparison unit for calculating said difference of said exponent parts in said two operands;

a right shifter for performing an alignment of said mantissa parts in said two operands;

a size comparison unit for comparing a size of said mantissa parts of said two operands;

a canceling prediction circuit comprising:
  a canceling bit prediction signal generation circuit for predicting an amount of canceling occurred in subtraction result of said subtraction unit within an error of one bit, and then for generating a canceling bit prediction signal indicating a position of said canceling bit; and
  a canceling bit position determination circuit for converting said canceling bit prediction signal to a binary number and for outputting it as a canceling prediction signal, a canceling error detection circuit for detecting an error of said canceling prediction signal;

a left shifter for performing a normalization operation for said subtraction result from said subtraction unit by shifting said subtraction result leftward; and an error compensation shifter for compensating said error of said subtraction result based on said detection result detected by said prediction error detection circuit, wherein said subtraction unit performs a subtraction operation between said mantissa parts of said two operands, or between one mantissa part and a shifted value obtained by shifting another mantissa part rightward in said two operands based on said difference of said exponent parts from said exponent comparison unit, and then outputs a subtraction result, said canceling prediction circuit inputs directly said mantissa parts of said two operands and also inputs said difference of said exponent parts from said exponent comparison unit, and outputs said canceling prediction amount, caused by said subtraction operation by said subtraction unit, to said left shifter, said prediction error detection circuit inputs directly said mantissa parts in said two operands, inputs said difference of said exponent parts from said exponent comparison unit, inputs said canceling prediction signal from said canceling prediction circuit, and inputs a comparison result of said mantissa parts output from said size comparison unit, and then outputs an error detection signal indicating a presence of said prediction error output from said canceling prediction circuit, said left shifter performs said normalization operation by shifting leftward said subtraction result output from said subtraction unit based on a canceling prediction amount indicated by said canceling prediction signal output from said canceling prediction circuit, and said error compensation shifter compensates an error of said subtraction result normalized by said left shifter based on said error detection signal output from said prediction error detection circuit, wherein in said canceling prediction circuit for predicting a canceling amount included in said subtraction result obtained by said subtraction unit within an error of one bit, said canceling bit prediction signal generation circuit generates said canceling bit prediction signal EE in the following logic cases (I), (II), and (III) based on said difference of said exponent parts (Exa-Exb) in said two operands, where, said mantissa parts in said two operands "a" and "b" are $Fa<n:0>$ and $Fb<n:0>$, each having "n+1" bit width, said exponent parts are Exa and Exb, a logical product is "and" and a logical sum is "or", an exclusive logical sum is "xor", and a logical not "not", and (I) when Exa−Exb=1, said canceling bit prediction signal EE to indicate said predicted position of said canceling bit caused in subtraction result between continuous two bits in said two operands is predicted by following logic:

$EE<i>=$(not $(P<i>))$ and (not $(Z(i-1>)),$ wherein, when an integer i is i<n, $G<i>=(Fa<i>)$ and (not $(Fb<i+1>)),$ $P<i>=(Fa(<i>)$ xor (not $(Fb<i+1>)),$ $Z<i>=$(not $(Fa<i>))$ and $(Fb<i+1>),$ and $G<n>=1, Z<n>=P<n>=0, Z<-1>=Fb<0>, G<-1>=0,$ and $P<-1>=$ not $(Fb<0>);$ (II) when Exa−Exb=0, said canceling bit prediction signal EE to indicate said predicted position of said canceling bit caused in subtraction result between continuous three bits in said two operands is predicted by following logic:

$EE<i>=[P<i+1>$ and $\{(Z<i>$ and (not $(G<i-1>)))$ or $(G<i>$ and (not $(Z<i-1>)))\}]$ or [not $(P<i+1>)$ and $\{(Z<i>$ and (not $(Z<i-1>)))$ or $(G<i>$ and (not $(G<i-1>)))\}],$ wherein, when an integer i is i<n, $G<i>$ $(Fa<i>)$ and (not $(Fb<i>)),$ $P<i>=(Fa<i>)$ xor (not $Fb<i>)),$ $Z<i>=$(not $(Fa<i>))$ and $(Fv<i>),$ and $P\langle n\rangle=1$, $G\langle n\rangle=Z\langle n\rangle=0$, $Z\langle -1\rangle=0$, $G\langle -1\rangle=0$, and $P\langle -1\rangle=1$; and (III) when Exa−Exb=−1, said canceling bit prediction signal EE to indicate said predicted position of said canceling bit caused in subtraction result between continuous two bits in said two operands is predicted by following logic:

$EE\langle i\rangle=$(not $(P\langle i\rangle)$) and (not $(G\langle i-1\rangle)$), wherein, when an integer i is i<n, $G\langle i\rangle=$(not $Fb\langle i\rangle$) and $(Fa\langle i+1\rangle)$), $P\langle i\rangle=$(not $Fb\langle i\rangle$) xor $(Fa\langle i+1\rangle)$), $Z\langle i\rangle=Fa\langle i\rangle$ and (not $(Fa\langle i+1\rangle)$), and $Z\langle n\rangle=1$, $G\langle n\rangle=P\langle n\rangle=0$, $G\langle -1\rangle=Fa\langle 0\rangle$, $Z\langle -1\rangle=0$, and $P\langle -1\rangle=$ not $(Fa\langle 0\rangle)$, wherein, said canceling bit position determination circuit outputs said canceling bit position in binary number expression which is a most significant bit "i" in said $EE\langle i\rangle=$"1", and with said canceling bit position determination circuit, said canceling prediction error detection circuit determines the values $G(-1)\langle k-1\rangle$ and $Z(-1)\langle k-1\rangle$, where, $P(k)\langle k\rangle=P\langle k\rangle$, $G(k)\langle k\rangle=G\langle k\rangle$, $Z(k)\langle k\rangle=Z\langle k\rangle$, $P(k)\langle k+1\rangle=(P(k+1)\langle k+1\rangle)$ and $(P(k)\langle k\rangle)$, $G(k)\langle k+1\rangle=(G(k+1)\langle k+1\rangle)$ and $\{(P(k+1)\langle k+1\rangle)$ and $(G(k)\langle k\rangle)\}$, $Z(k)\langle k+1\rangle=(Z(k+1)\langle k+1\rangle)$ and $\{(P(k+1)\langle k+1\rangle)$ and $(Z(k)\langle k\rangle)\}$, and $P(m)\langle k\rangle=(P(n)\langle k\rangle)$ and $\{(P(m)\langle n-1\rangle)$ $(m<n<k)$, $G(m)\langle k\rangle=G(n)\langle k\rangle$ or $\{(P(n)\langle k\rangle)$ and $(G(m)\langle n-1\rangle)\}(m<n<k)$, $Z(m)\langle k\rangle=Z(n)\langle k\rangle$ or $\{(P(n)\langle k\rangle)$ and $(Z(m)\langle n1\rangle)\}(m<n<k)$, and said canceling prediction error detection circuit selects said $G(-1)\langle k-1\rangle$ when (Fa−Fb)<0 that is output from said size comparison circuit, and $Z(-1)\langle k-1\rangle$ when (Fa−Fb)>0 that is output from said size comparison circuit.

6. A floating point execution unit for switching operation procedures according to absolute values (that are not less than 2 and less than 2) of a difference of exponent parts in two operands as floating point numbers, comprising:

an addition subtraction unit for performing an addition and for performing a subtraction when said absolute value of said difference of said exponent parts in said two operands is not less than 2;

a subtraction unit for performing only a subtraction when said absolute value of said difference of said exponent parts in said two operands is less then 2;

an exponent part comparison unit for calculating said difference of said exponent parts in said two operands;

a right shifter for performing an alignment of said mantissa parts in said two operands;

a size comparison unit for comparing a size of said mantissa parts of said two operands;

a canceling prediction circuit comprising:
  a canceling bit prediction signal generation circuit for predicting an amount of canceling occurred in subtraction result of said subtraction unit within an error of one bit, and then for generating a canceling bit prediction signal indicating a position of said canceling bit; and
  a canceling bit position determination circuit for converting said canceling bit prediction signal to a binary number and for outputting it as a canceling prediction signal, a canceling error detection circuit for detecting an error of said canceling prediction signal;

a left shifter for performing a normalization operation for said subtraction result from said subtraction unit by shifting said subtraction result leftward; and an error compensation shifter for compensating said error of said subtraction result based on said detection result detected by said prediction error detection circuit, wherein said subtraction unit performs a subtraction operation between said mantissa parts of said two operands, or between one mantissa part and a shifted value obtained by shifting another mantissa part rightward in said two operands based on said difference of said exponent parts from said exponent comparison unit, and then outputs a subtraction result, said canceling prediction circuit inputs directly said mantissa parts of said two operands and also inputs said difference of said exponent parts from said exponent comparison unit, and outputs said canceling prediction amount, caused by said subtraction operation by said subtraction unit, to said left shifter, said prediction error detection circuit inputs directly said mantissa parts in said two operands, inputs said difference of said exponent parts from said exponent comparison unit, inputs said canceling prediction signal from said canceling prediction circuit, and inputs a comparison result of said mantissa parts output from said size comparison unit, and then outputs an error detection signal indicating a presence of said prediction error output from said canceling prediction circuit, said left shifter performs said normalization operation by shifting leftward said subtraction result output from said subtraction unit based on a canceling prediction amount indicated by said canceling prediction signal output from said canceling prediction circuit, and said error compensation shifter compensates an error of said subtraction result normalized by said left shifter based on said error detection signal output from said prediction error detection circuit, wherein in said canceling prediction circuit for predicting a canceling amount included in said subtraction result obtained by said subtraction unit within an error of one bit, said canceling bit prediction signal generation circuit generates said canceling bit prediction signal EE in the following logic cases (I), (II), and (III) based on said difference of said exponent parts (Exa−Exb) in said two operands, where, said mantissa parts in said two operands "a" and "b" are $Fa\langle n:0\rangle$ and $Fb\langle n:0\rangle$, each having "n+1" bit width, said exponent parts are Exa and Exb, a logical product is "and" and a logical sum is "or", an exclusive logical sum is "xor", and a logical not "not", and (I) when Exa−Exb=1, said canceling bit prediction signal EE to indicate said predicted position of said canceling bit caused in subtraction result between continuous two bits in said two operands is predicted by following logic:

$EE<i>=$(not $P<i>$)) and (not $(Z<i-1>))$, wherein, when an integer i is i<n, $G<i>=(Fa<i>)$ and (not $(Fb<i+1>))$, $P<i>=(Fa<i>)$ xor (not $(Fb<i+1>))$, $Z<i>=$(not $(Fa<i>))$ and $(Fb<i+1>)$, and $G<n>=1, Z<n>=P<n>=0, Z<-1>=Fb<0>, G<-1>=0,$ and $P<-1>=$ not $(Fb<0>)$;

(II) when Exa−Exb=0, said canceling bit prediction signal EE to indicate said predicted position of said canceling bit caused in subtraction result between continuous three bits in said two operands is predicted by following logic:

$EE<i>=[P<i+1>$ and $\{(Z<i>$ and (not $(G<i-1>)))$ or $(G<i>$ and (not $(Z<i-1>)))\}]$ or [not $(P<i+1>)$ and $\{(Z<i>$ and (not $(Z<i-1>)))$ or $(G<i>$ and (not $(G<i-1>)))\}]$, wherein, when an integer i is i<n, $G<i>=(Fa<i>)$ and (not $(Fb<i>))$, $P<i>=(Fa<i>)$ xor (not $(Fb<i>))$, $Z<i>=$(not $(Fa<i>))$ and $(Fb<i>)$, and $P<n>=1, G<n>=Z<n>=0, Z<-1>=0, G<-1>=0,$ and $P<-1>=1$ and (III) when Exa−Exb=−1, said canceling bit prediction signal EE to indicate said predicted position of said canceling bit caused in subtraction result between continuous two bits in said two operands is predicted by following logic:

$EE<i>=$(not $(P<i>))$ and (not $(G<i-1>))$, wherein, when an integer i is i<n, $G(<i>=$(not $Fb<i>)$ and $(Fa<i+1>))$, $P<i>=$(not $Fb<i>)$ xor $(Fa<i+1>))$, $Z<i>=Fa<i>$ and (not $(Fa<i+1>))$, and $Z<n>=1, G<n>=P<n>=0, G<-1>=Fa<0>, Z<-1>=0,$ and $P<-1>=$ not $(Fa<0>)$, wherein, said canceling bit position determination circuit outputs said canceling bit position In binary number expression which is a most significant bit "i" in said EE <i>="1", and with said canceling bit position determination circuit, said canceling prediction error detection circuit determines the values $G(-1)<k-1>$ and $Z(-1)<k-1>$, where, $P(k)<k>=P<k>$, $G(k)<k>=G<k>$, $Z(k)<k>=Z<k>$, $P(k)<k+1>=(P(k+1)<k+1>)$ and $(P(k)<k>)$, $G(k)<k+1>=(G(k+1)<k+1>)$ and $\{(P(k+1)<k+1>)$ and $(G(k)<k>)\}$, $Z(k)<k+1>=(Z(k+1)<k+1>)$ and $\{(P(k+1)<k+1>)$ and $(Z(k)<k>)\}$, and $P(m)<k>=(P(n)<k>)$ and $\{(P(m)<n-1>)$ $(m<n<k)$, $G(m)<k>=G(n)<k>$ or $\{(P(n)<k>)$ and $(G(m)<n-1>)\}(m<n<k)$, and $Z(m)<k>=Z(n)<k>$ or $\{(P(n)<k>)$ and $(Z(m)<n-1>)\}(m<n<k)$, and said canceling prediction error detection circuit selects said $G(-1)<k-1>$ when $(Fa-Fb)<0$ that is output from said size comparison circuit, and said $Z(-1)<k-1>$ when $(Fa-Fb)>0$ that is output from said size comparison circuit.

* * * * *